(12) United States Patent
Suzuki et al.

(10) Patent No.: US 9,482,822 B2
(45) Date of Patent: Nov. 1, 2016

(54) WAVELENGTH SELECTOR SWITCH

(71) Applicant: Sumitomo Electric Industries, Ltd., Osaka-shi (JP)

(72) Inventors: Masaki Suzuki, Yokohama (JP); Hidehisa Tazawa, Yokohama (JP); Takafumi Ohtsuka, Yokohama (JP); Takeshi Inoue, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/905,039

(22) PCT Filed: Jul. 17, 2013

(86) PCT No.: PCT/JP2013/069405
§ 371 (c)(1),
(2) Date: Jan. 14, 2016

(87) PCT Pub. No.: WO2015/008349
PCT Pub. Date: Jan. 22, 2015

(65) Prior Publication Data
US 2016/0216452 A1    Jul. 28, 2016

(51) Int. Cl.
*G02B 6/26* (2006.01)
*G02B 6/35* (2006.01)

(52) U.S. Cl.
CPC .............. *G02B 6/3594* (2013.01); *G02B 6/356* (2013.01); *G02B 6/3512* (2013.01); *G02B 6/3534* (2013.01)

(58) Field of Classification Search
CPC .................... G02B 6/356; G02B 2006/12104; G02B 2006/12145; G02B 6/3594; G02B 6/3512; G02B 6/3534; H04Q 11/0005

USPC ....................................................... 385/14–18
See application file for complete search history.

(56) References Cited

U.S. PATENT DOCUMENTS 6,781,730 B2 * 8/2004 Weaver .................. G02B 6/266
359/223.1
7,397,980 B2   7/2008 Frisken
(Continued)

FOREIGN PATENT DOCUMENTS

JP    2008-139477 A    6/2008
JP    2008-224824 A    9/2008
(Continued)

OTHER PUBLICATIONS

International Search Report in International Application No. PCT/JP2013/069405, dated Sep. 17, 2013.
(Continued)

*Primary Examiner* — Ellen Kim
(74) *Attorney, Agent, or Firm* — Venable LLP; Michael A. Sartori

(57) ABSTRACT

A wavelength selective switch 1A includes a light input/output unit 10, a dispersive element 20, and a light deflection element 30 disposed side by side on a predetermined axis C. The light input/output unit 10 has a first portion 10a in which light enters and exits a light input/output port 11 by an optical axis inclined with respect to the predetermined axis C, and a second portion 10b in which light enters and exits a light input/output port 12 by an optical axis inclined with respect to the predetermined axis C. A light entry/exit angle of the light input/output port 11 with the predetermined axis C as a reference and a light entry/exit angle of the light input/output port 12 with the predetermined axis C as a reference differ from each other.

23 Claims, 26 Drawing Sheets

(56) References Cited

U.S. PATENT DOCUMENTS

| | | |
|---|---|---|
| 7,725,027 B2 | 5/2010 | Keyworth et al. |
| 2008/0298738 A1 | 12/2008 | Ishikawa et al. |
| 2009/0110349 A1 | 4/2009 | Presley et al. |
| 2011/0229132 A1 | 9/2011 | Matsumoto |
| 2011/0292482 A1* | 12/2011 | Matsumoto ............ G02B 6/356 359/223.1 |
| 2012/0057869 A1 | 3/2012 | Colbourne |
| 2012/0237218 A1 | 9/2012 | Yang et al. |
| 2012/0328238 A1 | 12/2012 | Inoue et al. |
| 2013/0028556 A1 | 1/2013 | Cohen et al. |
| 2014/0072302 A1 | 3/2014 | Iwama et al. |
| 2014/0268305 A1 | 9/2014 | Tazawa et al. |
| 2015/0023662 A1 | 1/2015 | Suzuki et al. |

FOREIGN PATENT DOCUMENTS

| | | |
|---|---|---|
| JP | 2009-276747 A | 11/2009 |
| JP | 2010-509639 A | 3/2010 |
| JP | 2011-064721 A | 3/2011 |
| JP | 2011-145462 A | 7/2011 |
| JP | 2011-248000 A | 12/2011 |
| WO | WO-2008/057347 A2 | 5/2008 |
| WO | WO-2012/125390 A2 | 9/2012 |
| WO | WO-2013/016758 A1 | 2/2013 |

OTHER PUBLICATIONS

International Search Report in International Application No. PCT/JP2013/081542, dated Feb. 10, 2014.

International Preliminary Report on Patentability and Written Opinion in International Patent Application No. PCT/JP2013/069405, dated Jan. 28, 2016.

International Preliminary Report on Patentability and Written Opinion in International Patent Application No. PCT/JP2013/081542, dated Jan. 28, 2016.

* cited by examiner

Fig.26
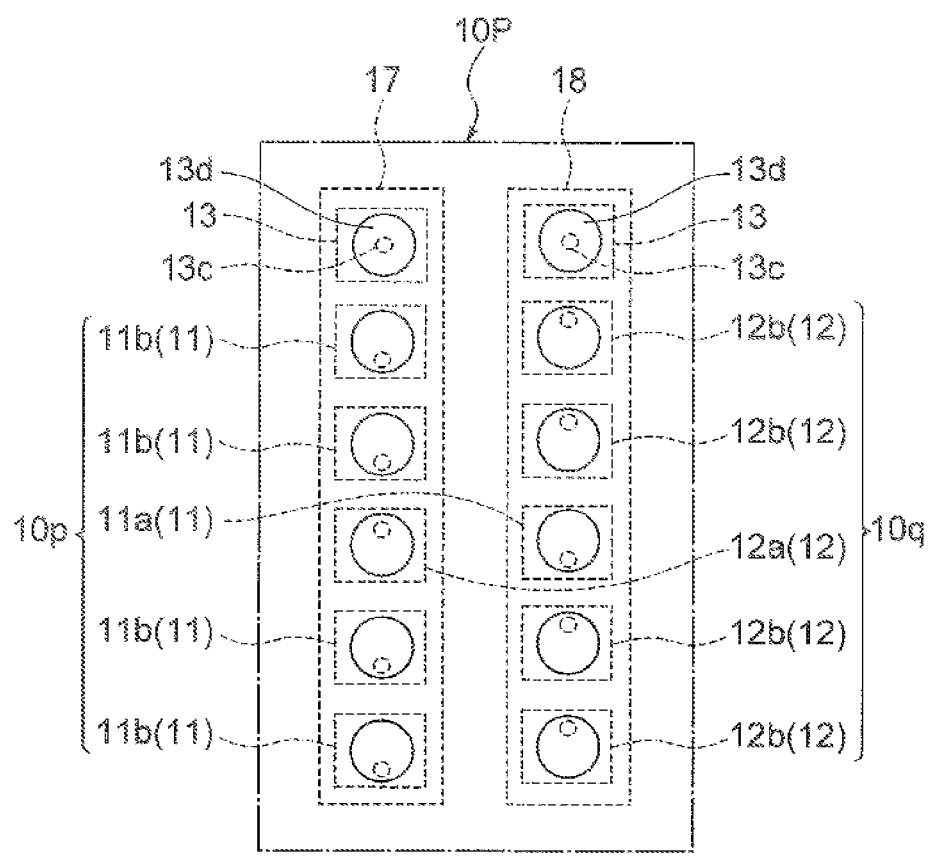
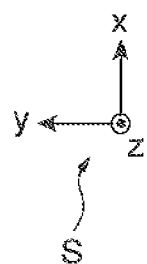

WAVELENGTH SELECTOR SWITCH

TECHNICAL FIELD

The present invention relates to a wavelength selective switch.

BACKGROUND ART

In Patent Literature 1, an invention relating to a wavelength selective switch is disclosed. This wavelength selective switch includes a plurality of light input/output units, a light dispersion means, a light condensing element, and a light deflection element array. The plurality of light input/output units are arranged in an array shape in a first direction and includes a light input unit and a light output unit. The light dispersion means separates wavelength-multiplexed light input from an input unit into wavelength components. The light condensing element condenses the wavelength components after the separation toward the light deflection element array. The light deflection element array deflects the wavelength components in the first direction so that the wavelength components condensed by the light condensing element are switched to a desired output unit. The input/output units are divided into m (m is an integer) groups, and m light deflection element arrays are arranged to correspond to the in groups of the input/output units in the first direction. The light dispersion means is provided in common for the m groups of the input/output units.

CITATION LIST

Patent Literatures

[Patent Literature 1] Japanese Unexamined Patent Publication No. 2011-248000
[Patent Literature 2] U.S. Pat. No. 7,725,027
[Patent Literature 3] U.S. Pat. No. 7,397,980
[Patent Literature 4] PCT International Publication No. WO 2012/125390
[Patent Literature 5] Japanese Unexamined Patent Publication No. 2011-064721
[Patent Literature 6] PCT International Publication No. 2013/016758

SUMMARY OF INVENTION

Technical Problem

As a form of the wavelength selective switch, there is a form in which the light input/output units are divided into two or more groups and light deflection portions of the light deflection elements corresponding to entry/exit light of the groups, for example, are disposed side by side in a direction intersecting a dispersing direction (for example, see Patent Literature 1). By adopting this form, it is possible to separate (or couple) more wavelength components than those of the conventional wavelength selective switch.

In the wavelength selective switch disclosed in Patent Literature 1, a lens corresponding to each of the two or more groups of the light input/output units is disposed and an angle differing according to each group is assigned to the optical axis of entry/exit light by this lens. However, the number of components increases in the above-described configuration, an optical path length is increased by the number of above-described lenses, and the increased optical path length becomes a factor which interferes with size reduction of the wavelength selective switch.

An objective of the present invention is to provide a wavelength selective switch capable of separating (or coupling) more wavelength components without excessively lengthening an optical path length.

Solution to Problem

To solve the above-described problem, a wavelength selective switch according to an embodiment is a wavelength selective switch having a light input/output unit, a dispersive element, and a light deflection element disposed side by side on a predetermined axis, wherein the light input/output unit includes: a first portion having three or more first light input/output ports including a first light input port and a first light output port and in which light enters and exits the first light input/output port by an optical axis inclined in a first direction intersecting the predetermined axis with respect to the predetermined axis; and a second portion having three or more second light input/output ports including a second light input port and a second light output port and in which light enters and exits the second light input/output port by the optical axis inclined in the first direction with respect to the predetermined axis, wherein a light entry/exit angle of the first light input/output port with the predetermined axis as a reference and a light entry/exit angle of the second light input/output port with the predetermined axis as a reference differ from each other, wherein the dispersive element is provided in common for the first and second light input/output ports, and changes an optical axis of light entering and exiting the first and second light input/output ports at an angle according to a wavelength in a direction intersecting the predetermined axis and the first direction, and wherein the light deflection element includes: a first light deflection portion configured to direct light from the first light input port through the dispersive element to the first light output port; and a second light deflection portion configured to direct light from the second light input port through the dispersive element to the second light output port.

Advantageous Effects of Invention

According to a wavelength selective switch according to the present invention, it is possible to suppress the number of components and separate (or couple) more wavelength components without excessively lengthening an optical path length.

BRIEF DESCRIPTION OF DRAWINGS

FIG. 26 is a diagram illustrating a modified example of the third embodiment.

DESCRIPTION OF EMBODIMENTS

Hereinafter, a wavelength selective switch according to an embodiment will be described in detail with reference to the drawings. Also, the same or corresponding elements are assigned the same reference signs in the description of the drawings and redundant description thereof will be omitted.

(First Embodiment)

Figure 1:
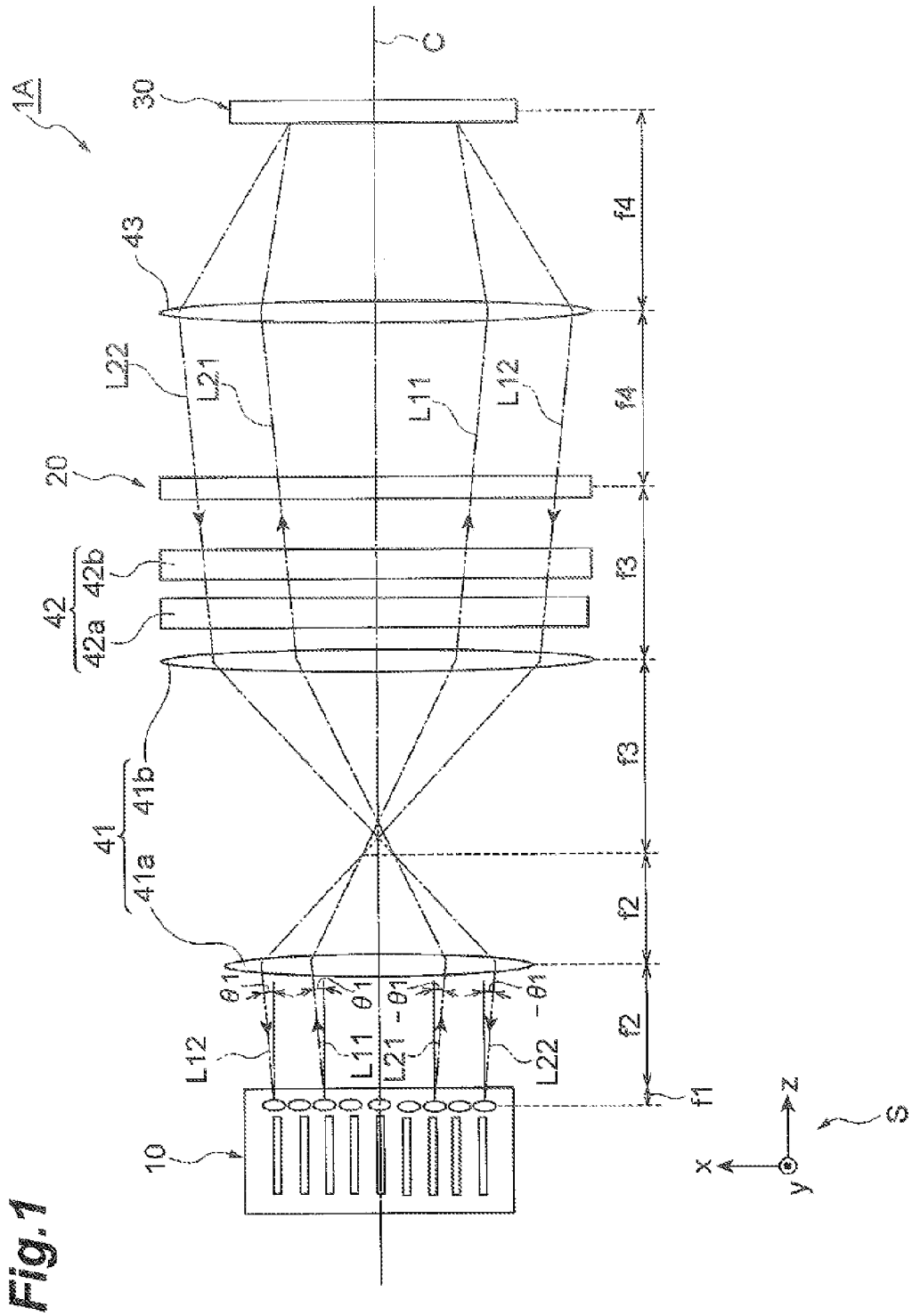
FIG. 1 is a schematic diagram illustrating a configuration of a wavelength selective switch according to a first embodiment.
Figure 2:
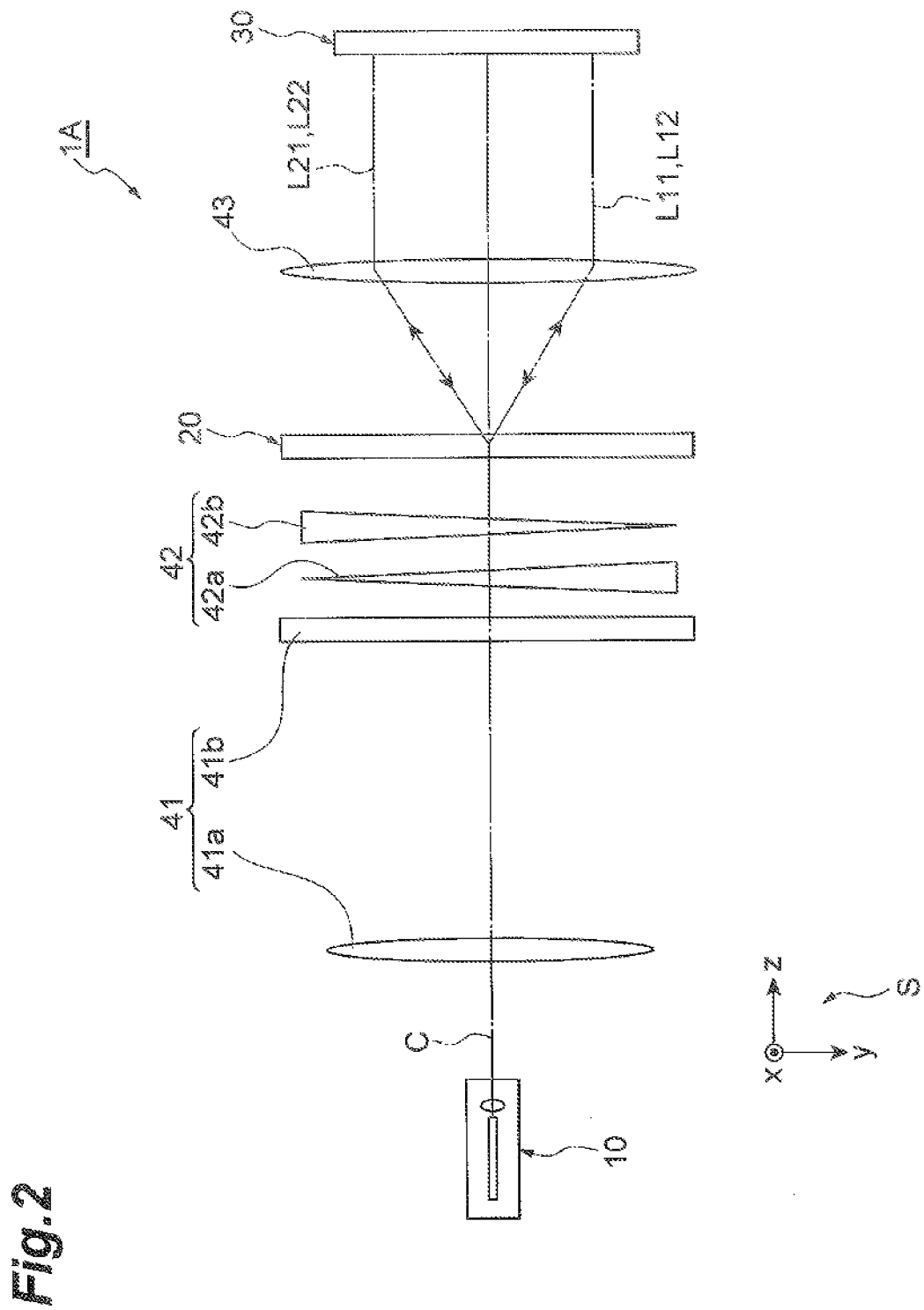
FIG. 2 is a schematic diagram illustrating a configuration of the wavelength selective switch according to the first embodiment.

FIGS. 1 and 2 are schematic diagrams illustrating a configuration of the wavelength selective switch 1A according to the first embodiment. Also, an orthogonal coordinate system S is illustrated in the following drawings. FIG. 1 is a side view of the wavelength selective switch 1A viewed from a y-axis direction of the orthogonal coordinate system S, and illustrates a schematic configuration of the wavelength selective switch 1A in a plane including an x-axis and a z-axis. FIG. 2 is a top view of the wavelength selective switch 1A viewed from an x-axis direction of the orthogonal coordinate system S and illustrates a schematic configuration of the wavelength selective switch 1A in a plane including the y-axis and the z-axis.

As illustrated in FIGS. 1 and 2, the wavelength selective switch 1A includes a light input/output unit 10, a dispersive element 20, and a light deflection element 30. The light input/output unit 10, the dispersive element 20, and the light deflection element 30 are disposed side by side on a predetermined axis C. The predetermined axis C is, for example, an axis extending in the z-axis direction. Also, although the predetermined axis C is linearly drawn in FIGS. 1 and 2, the predetermined axis C may be bent, for example, by disposing a reflection mirror or the like in the middle.

Figure 3:
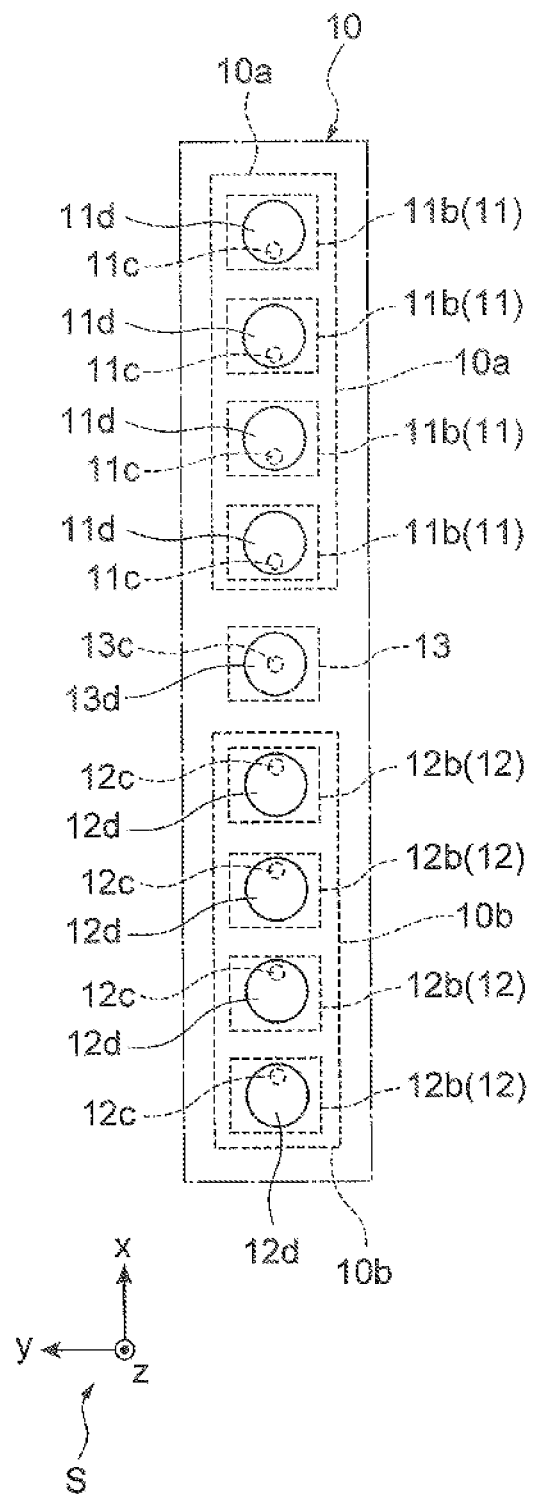
FIG. 3 is a diagram illustrating a configuration of a light input/output unit viewed from a z-axis direction.
Figure 4:
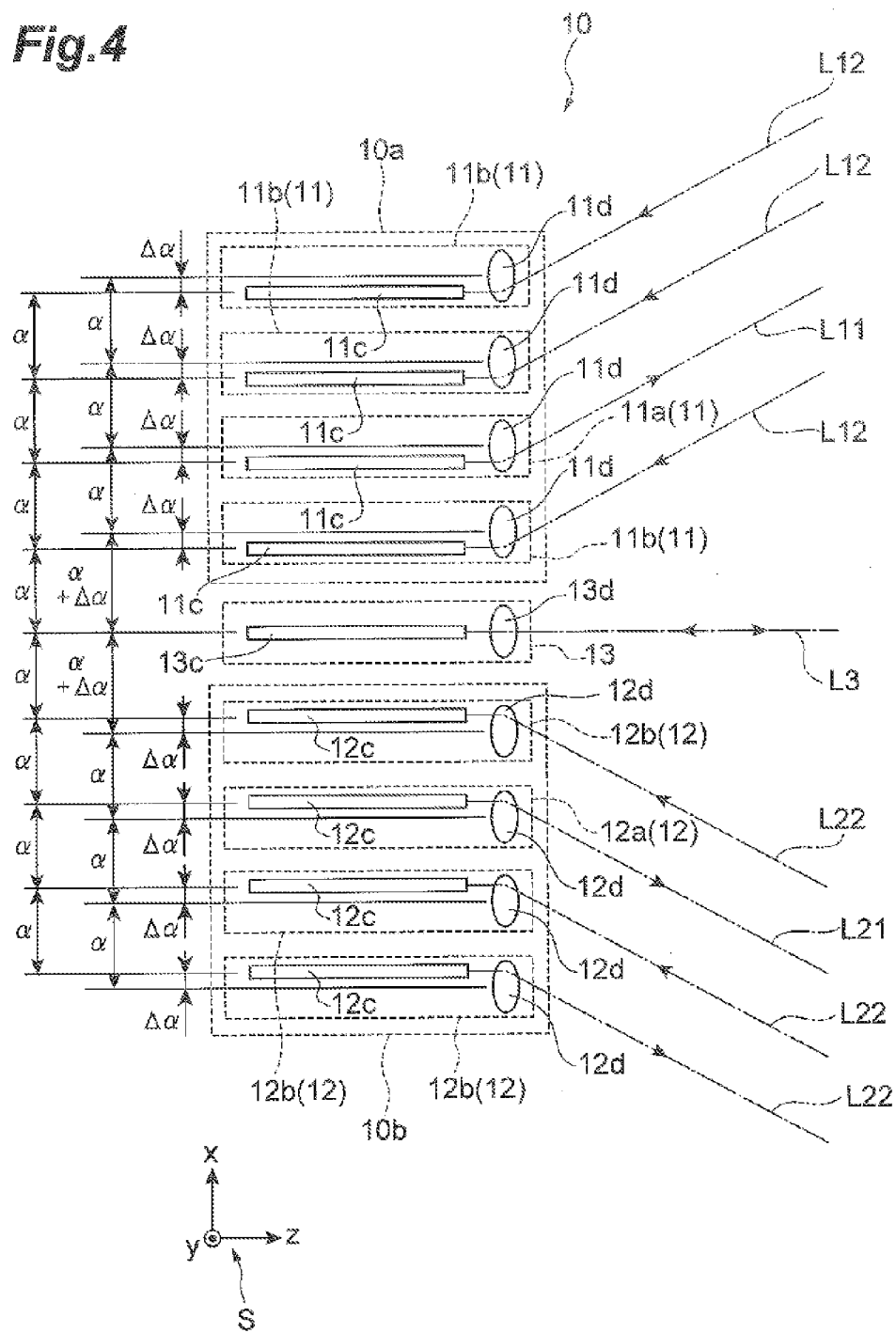
FIG. 4 is a side view illustrating a configuration of the light input/output unit viewed from a y-axis direction.

FIG. 3 is a diagram illustrating a configuration of a light input/output unit 10 viewed from a direction (z-axis direction) of the predetermined axis C. In addition, FIG. 4 is a side view illustrating the configuration of the light input/output unit 10 viewed from the y-axis direction. As illustrated in FIGS. 3 and 4, the light input/output unit 10 has a first portion 10a and a second portion 10b. The first portion 10a and the second portion 10b are disposed side by side in a first direction (x-axis direction in this embodiment) intersecting the predetermined axis C illustrated in FIGS. 1 and 2.

The first portion 10a includes three or more first light input/output ports 11. In this embodiment, the light input/output ports 11 are aligned in the x-axis direction. The light input/output ports 11 include one or more first light input ports 11a and one or more first light output ports 11b. As an example, one light input port 11a and a plurality of light output ports 11b are illustrated in FIGS. 3 and 4. In this case, the light input port 11a, for example, emits light L11 which is wavelength-multiplexed light to the inside of the wavelength selective switch 1A. The light output port 11b, for example, receives a wavelength component L12 deflected by the light deflection element 30.

As illustrated in FIG. 4, in the first portion 10a, the entry and exit of light of the light input/output port 11 by the optical axis inclined in the first direction (the x-axis direction in this embodiment) intersecting the predetermined axis C with respect to the predetermined axis C (that is, the exit of the light L11 from the light input port 11a and the entry of the wavelength component L12 to the light output port 11b) are performed. An angle range of a light entry/exit angle θ1 of the light input/output port 11 using the predetermined axis C as a reference is, for example, 0°<θ1<5° when the predetermined axis C is set at 0°. More preferably, it is 0°<θ1<3°.

The second portion 10b includes three or more second light input/output ports 12. In this embodiment, the light input/output ports 12 are aligned in the x-axis direction. The light input/output ports 12 include one or more second light input ports 12a and one or more second light output ports 12b. As an example, one light input port 12a and a plurality of light output ports 12b are illustrated in FIGS. 3 and 4. In this case, the light input port 12a, for example, emits light L21 which is wavelength-multiplexed light to the inside of the wavelength selective switch 1A. The light output port 12b, for example, receives a wavelength component L22 deflected by the light deflection element 30.

As illustrated in FIG. 4, in the second portion 10b, the entry and exit of light of the light input/output port 12 by the optical axis inclined in the x-axis direction (that is, the exit of the light L21 from the light input port 12a and the entry of the wavelength component L22 to the optical output port 12b) are performed. The light entry/exit angle of the light input/output port 12 using the predetermined axis C as a reference is different from the light entry/exit angle θ1 of the light input/output port 11 and is, for example, −θ1.

Each light input/output port 11 is configured to include an optical fiber 11c and a light condensing element (light condensing lens) 11d. Light condensing elements 11d are provided in a one-to-one relation to optical fibers 11c, and optically coupled to end surfaces of the corresponding optical fibers 11c. Likewise, each light input/output port 12 is configured to include an optical fiber 12c and a light condensing element (light condensing lens) 12d. Light condensing elements 12d are provided in a one-to-one relation to optical fibers 12c, and optically coupled to end surfaces of the corresponding optical fibers 12c.

As illustrated in FIG. 4, optical axes of each optical fiber 11c and one light condensing element 11d corresponding to each optical fiber 11c are shifted from each other. Specifically, the optical axis of the light condensing element 11d is shifted by Δα (>0) with respect to the optical axis of the optical fiber 11c. Shift amounts Δα in three or more light input/output ports 11 are mutually equal. Thereby, a uniform positive light entry/exit angle θ1 is assigned to the three or more light input/output ports 11. Also, in this embodiment, three or more optical fibers 11c are mutually disposed spaced apart art intervals α, and three or more light condensing elements 11d corresponding thereto are also mutually disposed spaced apart at intervals α.

On the other hand, optical axes of each optical fiber 12c and one light condensing element 12d corresponding to each optical fiber 12c are also shifted from each other in the x-axis direction. Here, a shift amount is different from a shift amount of the light condensing element 11d and is, for example, −Δα. Shift amounts −Δα in three or more light input/output ports 12 are mutually equal. Thereby, a uniform light entry/exit angle −θ1 is assigned to the three or more light input/output ports 12. Also, in this embodiment, three or more optical fibers 12c are mutually disposed spaced apart at intervals α, and three or more light condensing elements 12d corresponding thereto are also mutually disposed spaced apart at intervals α.

In addition, in this embodiment, the light input/output unit 10 further includes an alignment port 13 separately from the light input/output ports 11 and 12. The alignment port 13 is a port that alignment light L3 enters and exits by the optical axis along the predetermined axis C. The alignment port 13 also includes an optical fiber 13c and a light condensing element 13d optically coupled to an end surface of the optical fiber 13c. Here, the optical axis of the optical fiber 13c and the optical axis of the light condensing element 13d match each other. Accordingly, the light L3 which enters and exits the alignment port 13 propagates along the predetermined axis C.

The alignment port 13 may be provided in common for the first portion 10a and the second portion 10b as illustrated in FIGS. 3 and 4 or at least one alignment port 13 may be provided for each of the first portion 10a and the second portion 10b. In this embodiment, one alignment port 13 is disposed between the first portion 10a and the second portion 10b.

The optical fibers 11c and 12c adjacent to the optical fiber 13c and the optical fiber 13c are mutually disposed spaced apart at intervals α. On the other hand, the light condensing elements 11d and 12d adjacent to the light condensing element 13d and the light condensing element 13d are mutually disposed spaced apart at intervals α+Δα. Through this configuration, the shift amounts Δα of the optical axes of the optical fiber 11c and the light condensing element 11d and the shift amounts −Δα of the optical axes of the optical fiber 12c and the light condensing element 12d described above are implemented. In other words, in this embodiment, the optical fibers 11c, 12c, and 13c are mutually arranged at regular pitches and the light condensing elements 11d, 12d, and 13d are mutually arranged at irregular pitches. The position of the light condensing element 11d is shifted to one side of an arrangement direction (a positive side of the x-axis) with respect to the optical fiber 11c and the position of the light condensing element 12d is shifted to the other side of the arrangement direction (a negative side of the x-axis) with respect to the optical fiber 12c.

FIGS. 1 and 2 will be referred to again. The wavelength selective switch 1A further includes a relay optical system 41 and an anamorphic optical system 42 as a previous-stage optical system disposed on the predetermined axis C between the light input/output unit 10 and the dispersive element 20. The relay optical system 41 includes two lenses 41a and 41b provided in common for the light input/output ports 11 and 12. The lens 41a, for example, is a convex spherical lens having light power in the x-axis direction and the y-axis direction. The lens 41a is disposed in a stage previous to the lens 41b and a front-side focus of the lens 41a approximately matches a rear-side focus of the light condensing elements 11d to 13d (see FIG. 4). That is, the lens 41a is disposed at a position separated a focal distance f1 of the light condensing elements 11d to 13d provided in the light input/output unit 10 and a focal distance f2 of the lens 41a from the light condensing elements 11d and 12d.

It is preferable that the lens 41a relatively further increases a beam size at beam waist positions of the light L11 and the light L21 after passing through the lens 41a as compared to a beam size at beam waist positions of the light L11 and the light L21 entering the lens 41a from the light input/output unit 10 in the x-axis direction and the y-axis direction. In this manner, it is possible to suppress an increase in losses in the light input/output ports 11 and 12 of the light input/output unit 10, for example, when optical control is performed via the relay optical system 41 and the anamorphic optical system 42 in the wavelength selective switch 1A.

The lens 41b has light power in at least the x-axis direction. The lens 41b is, for example, a cylindrical lens having light power in only the x-axis direction. The lens 41b has light power in only the x-axis direction. Thus, beam sizes of the light L11 and the light L21 are relatively smaller in the x-axis direction than in the y-axis direction and are relatively enlarged in the y-axis direction. The front-side focus of the lens 41b is disposed to approximately match the rear-side focus of the lens 41a. Also, the rear-side focus of the lens 41b is disposed to approximately match the front-side focus of a light condensing lens 43 to be described below. That is, the lens 41b is arranged at a position separated a focal distance f3 of the lens 41b and the focal distance f4 of the light condensing lens 43 from the light condensing lens 43 as a position separated the focal distance f2 of the lens 41a and the focal distance f3 of the lens 41b from the lens 41a. Also, the lenses 41a and 41b are not limited to light transmission type lenses as illustrated in FIGS. 1 and 2, but may be reflection type lenses like mirrors.

The anamorphic optical system 42 is provided in common for the light input/output ports 11 and 12, and provided in a previous stage or a later stage of the relay optical system 41.

In FIGS. 1 and 2, a form in which the anamorphic optical system 42 is disposed in the later stage of the relay optical system 41 is illustrated. The anamorphic optical system 42, receives the light L11 and L21 exiting from the lens 41b of the relay optical system 41 and enlarges beam sizes of the light L11 and L21 in the y-axis direction to emit the light L11 and L21. It is only necessary for the anamorphic optical system 42 to have a function of converting an aspect ratio of an input beam to output the input beam. The anamorphic optical system 42 may be configured to reduce light in the x-axis direction. In the anamorphic optical system 42, a prism pair, a cylindrical lens, a cylindrical minor, etc. may be configured independently or in combination. In this embodiment, for example, a pair of prisms 42a and 42b are illustrated.

The dispersive element 20 is provided in common for the light input/output ports 11 and 12, and changes optical axes of the entry/exit light of the light input/output ports 11 and 12 at an angle according to a wavelength in a direction intersecting the predetermined axis C and the x-axis direction, for example, in the y-axis direction. When the light L11 and L21 from the light input ports 11a and 12a is wavelength-multiplexed light, the dispersive element 20 spectrally separates the light L11 and L21 into a plurality of wavelength components. In FIGS. 1 and 2, only certain wavelength components L12 and L22 of the plurality of wavelength components are representatively illustrated for facilitation of understanding. For example, a diffraction grating can be used as the dispersive element 20.

The light condensing lens (light condensing element) 43 is disposed on the predetermined axis C between the dispersive element 20 and the light deflection element 30. The light condensing lens 43 receives wavelength components L12 and L22 spectrally separated and emitted by the dispersive element 20 and couples the received wavelength components L12 and L22 to the light deflection element 30. At this time, light enlarged at predetermined magnification in the y-axis direction in the anamorphic optical system 42 is reduced in the y-axis direction at the magnification in the light condensing lens 43 (or light reduced at predetermined magnification in the x-axis direction in the anamorphic optical system 42 is enlarged at predetermined magnification in the x-axis direction in the light condensing lens 43), so that the beam size of the x-axis direction in the light deflection element 30 is configured to be larger than the beam size of the y-axis direction. As the light condensing lens 43, for example, a rotationally symmetric lens such as a convex spherical lens having light power in the x-axis direction and the y-axis direction is used.

The light deflection element 30 is disposed at the rear-side focus of the light condensing lens 43. The light deflection element 30 receives the wavelength component L12 condensed by the light condensing lens 43 via the dispersive element 20 from the light input port 11a and deflects the wavelength component L12 toward a predetermined light output port 11b according to its wavelength. Likewise, the light deflection element 30 receives the wavelength component L21 condensed by the light condensing lens 43 via the dispersive element 20 from the light input port 12a and deflects the wavelength component L22 toward a predetermined light output port 12b according to its wavelength. Thereby, the light deflection element 30 has a plurality of light deflection regions two-dimensionally arranged in the plane intersecting the predetermined axis C. The light deflection element 30 receives the corresponding wavelength components L21 and L22 in the light deflection regions and independently deflects the wavelength components L12 and L22 to the light output ports 11b and 12b.

Figure 5:
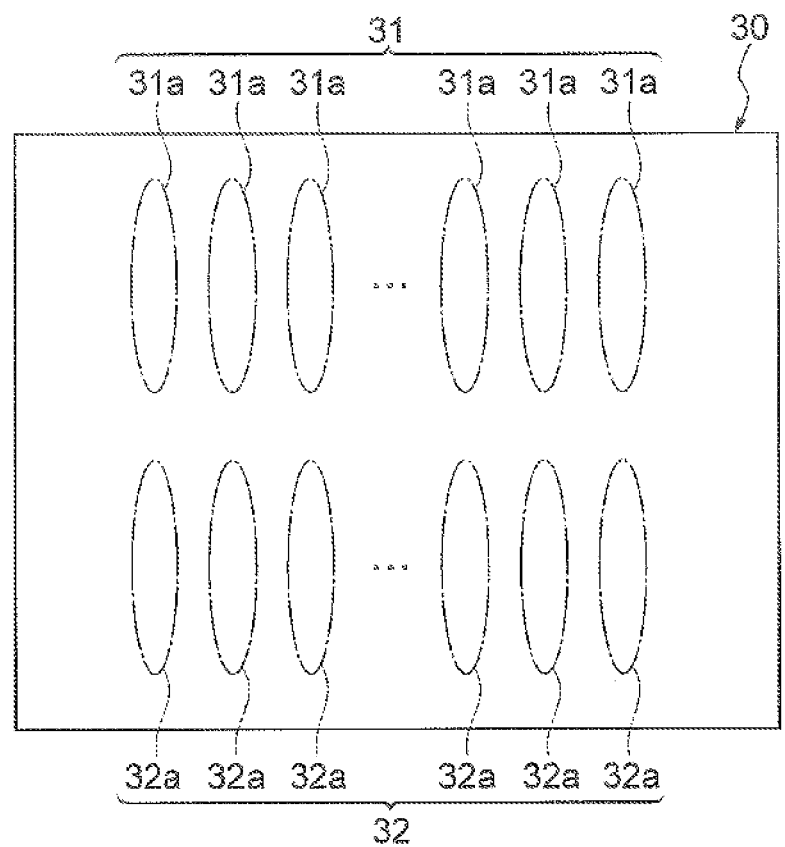
FIG. 5 is a front view illustrating a light deflection element viewed from a z-axis direction.

FIG. 5 is a front view of the light deflection element 30 viewed from a direction of the predetermined axis C. As illustrated in FIG. 5, the light deflection element 30 has a first light deflection portion 31 and a second light deflection portion 32 arranged in the x-axis direction. The first light deflection portion 31 includes a plurality of light deflection regions 31a arranged in the y-axis direction (dispersing direction), receives wavelength components from the light input ports 11a via the dispersive element 20 in the corresponding light deflection region 31a, and directs the wavelength components to the light output ports 11b. In addition, the second light deflection portion 32 includes a plurality of light deflection regions 32a arranged in the y-axis direction (dispersing direction), receives wavelength components from the light input ports 12a via the dispersive element 20 in the corresponding light deflection region 32a, and directs the wavelength components to the light output ports 12b.

Preferably, a phase modulation element, for example, such as liquid crystal on silicon (LCOS), is used as the light deflection element 30. This phase modulation element has a plurality of pixels for performing phase modulation and deflects an optical path of entry light by presenting a phase modulation pattern of a diffraction grating shape. Also, in addition to the phase modulation element, for example, various elements such as micro electro mechanical systems (MEMS) elements may be used as the light deflection element 30.

When an LCOS type phase modulation element is used as the light deflection element 30, optical axes of the wavelength components L12 and L22 arriving from the light input ports 11a and 12a may be orthogonal to the modulation surface of the phase modulation element in a plane (that is, an xz plane) including the predetermined axis C and the x-axis direction. Thereby, more precise deflection control becomes possible. This form, for example, may be more preferably implemented by setting light entry/exit angles $\theta1$ and $-\theta1$ of the light input/output ports 11 and 12 for the predetermined axis C so that the optical axes of the wavelength components L12 and L22 within the xz plane are orthogonal to the modulation surface. In this case, the previous-stage optical system (the relay optical system 41 and the anamorphic optical system 42) and the light condensing lens 43 may change optical paths of light from the light input/output ports 11 and 12 so that the optical axes of the wavelength components L12 and L22 within the xz plane are orthogonal to the modulation surface. Also, in this case, it is more preferable that the previous-stage optical system (the relay optical system 41 and the anamorphic optical system 42) in the x-axis direction and the central optical axis of the light condensing lens 43 match each other. Also, in this case, it is only necessary for the optical axes of the entry light L11 and L12 of the light input/output port 11 and the optical axes of the entry/exit light L21 and L22 of the light input/output port 12 to be mutually symmetrical to the predetermined axis C. Also, if the light exiting along the predetermined axis C reaches the modulation surface of the phase modulation element, the predetermined axis C is an axis for which the optical axis of light is an axis for which an optical axis of the light is orthogonal to the modulation surface of the phase modulation element within the surface including the predetermined axis and the first direction (within the xz plane).

The wavelength components L12 and L22 deflected by the light deflection element 30 reach the predetermined light output ports 11b and 12b via the light condensing lens 43, the dispersive element 20, the anamorphic optical system 42, and the relay optical system 41, and are output outside the wavelength selective switch 1A.

Effects obtained by the wavelength selective switch 1A of this embodiment, including the above configuration will be described. As described above, in the wavelength selective switch, disclosed in Patent Literature 1, a lens corresponding to each of two or more groups of light input/output units is disposed and an angle differing according to each group is assigned to an optical axis of entry/exit light by the lens. However, the number of components increases in this configuration, an optical path length is increased by the number of above-described lenses, and the increased optical path length becomes a factor which interferes with size reduction of the wavelength selective switch. On the other hand, in the wavelength selective switch 1A of this embodiment, a predetermined angle is assigned to an optical axis of entry/exit light for each of the first light input/output port 11 and the second light input/output port 12 of the light input/output unit 10 without using such a lens. Therefore, according to the wavelength selective switch 1A of this embodiment, it is possible to suppress the number of components and separate (or couple) more wavelength components without excessively lengthening an optical path length.

In addition, as in this embodiment, the light input/output ports 11 and 12 may include the optical fibers 11c and 12c and light condensing elements 11d and 12d provided in a one-to-one relation to the optical fibers 11c and 12c and optically coupled to end surfaces of the optical fibers 11c and 12c. In this case, optical axes of the optical fibers 11c and 12c and optical axes of the light condensing elements 11d and 12d are shifted from each other, so that light entry/exit angles θ1 and −θ1 in the light input/output ports 11 and 12 can be easily set with a simple configuration. Also, because the light input/output ports 11 and 12 can secure a sufficient effective diameter according to this form, it is possible to sufficiently increase absolute values of the light entry/exit angles θ1 and −θ1 even when a size of the wavelength selective switch 1A is reduced.

Also, as in this embodiment, the light input/output unit 10 may further include an alignment port 13 that alignment light L3 enters and exits by an optical axis along the predetermined axis C separately from the light input/output ports 11 and 12. Although it is difficult to use the light input/output ports 11 and 12 for alignment because entry/exit light is inclined, it is possible to easily perform an alignment operation by separately preparing such an alignment port 13.

(First Modified Example)

Figure 6:
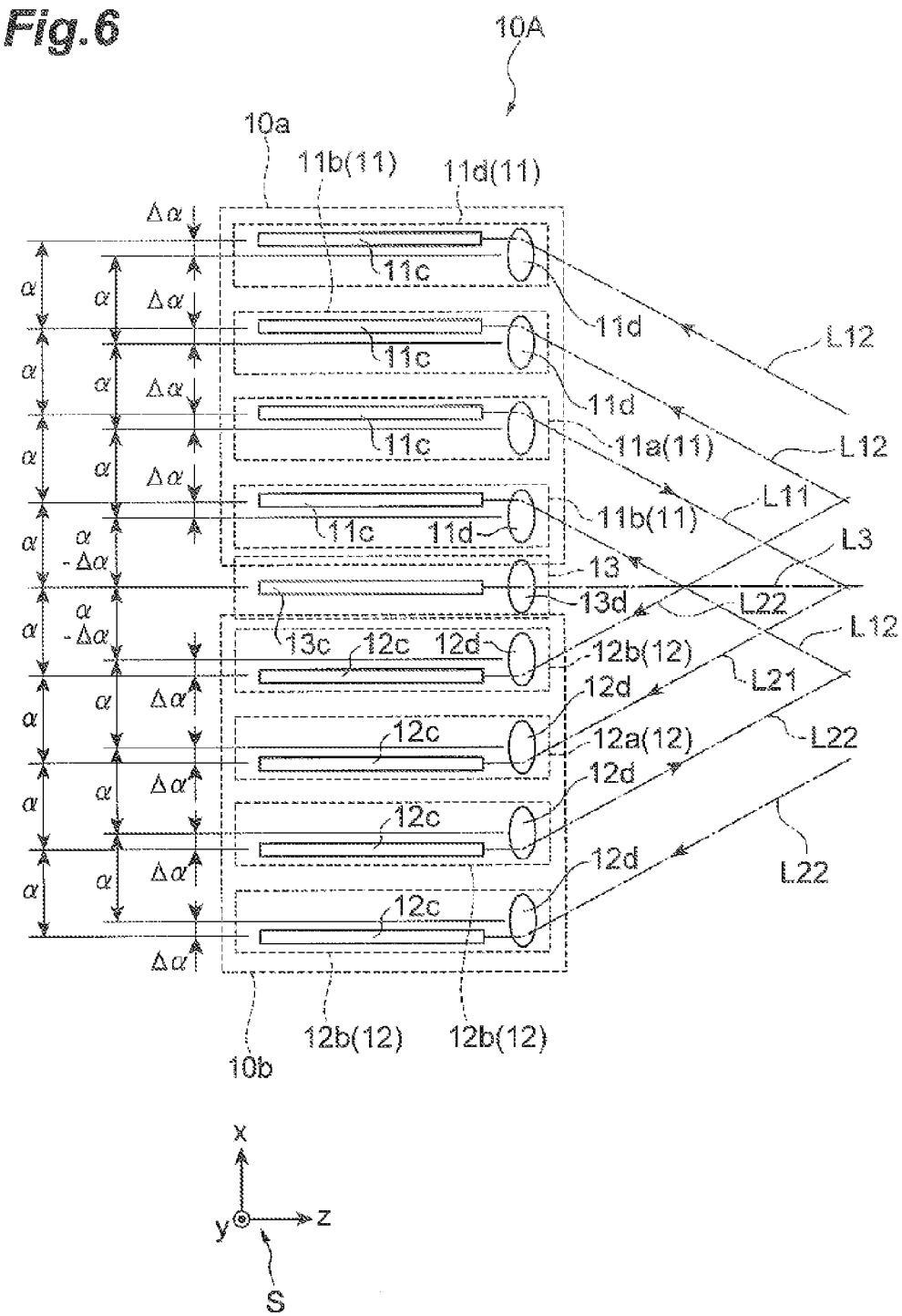
FIG. 6 is a side view schematically illustrating a configuration of a light input/output unit according to a first modified example.

FIG. 6 is a side view schematically illustrating a configuration of a light input/output unit 10A according to the modified example of the above-described first embodiment, and illustrates a form of the light input/output unit 10A viewed from the y-axis direction. In the light input/output unit 10A according to this modified example, unlike the above-described embodiment (see FIG. 4), an optical axis of the light condensing element 11d is shifted by −Δα with respect to the optical axis of the optical fiber 11c. Shift amounts −Δα in three or more light input/output ports 11 are mutually equal. Thereby, a uniform negative light entry/exit angle −θ1 is assigned to the three or more light input/output ports 11.

On the other hand, the optical axis of the light condensing element 12d is shifted by Δα in a positive direction with respect to the optical axis of the optical fiber 12c. Also, shift amounts Δα in three or more light input/output ports 12 are mutually equal. Thereby, a uniform positive light entry/exit angle θ1 is assigned to the three or more light input/output ports 12.

As described above, in this modified example, optical fibers 11c, 12c, and 13c are mutually arranged at regular pitches and light condensing elements 11d, 12d, and 13d are mutually arranged at irregular pitches. The position of the light condensing element 11d is shifted to one side of an arrangement direction (a negative side of the x-axis) with respect to the optical fiber 11c and the position of the light condensing element 12d is shifted to the other side of the arrangement direction (a positive side of the x-axis) with respect to the optical fiber 12c. Accordingly, because the light entry/exit angle in the light input/output port 11 becomes negative (−θ1) and the light entry/exit angle in the light input/output port 12 located at a negative side of the x-axis with respect to the light input/output port 11 becomes positive (θ1), the entry/exit light of the light input/output port 11 and the entry/exit light of the light input/output port 12 intersect, each other. Even in this form, it is possible to preferably have the operations and effects of the above-described first embodiment.

(Second Modified Example)

Figure 7:
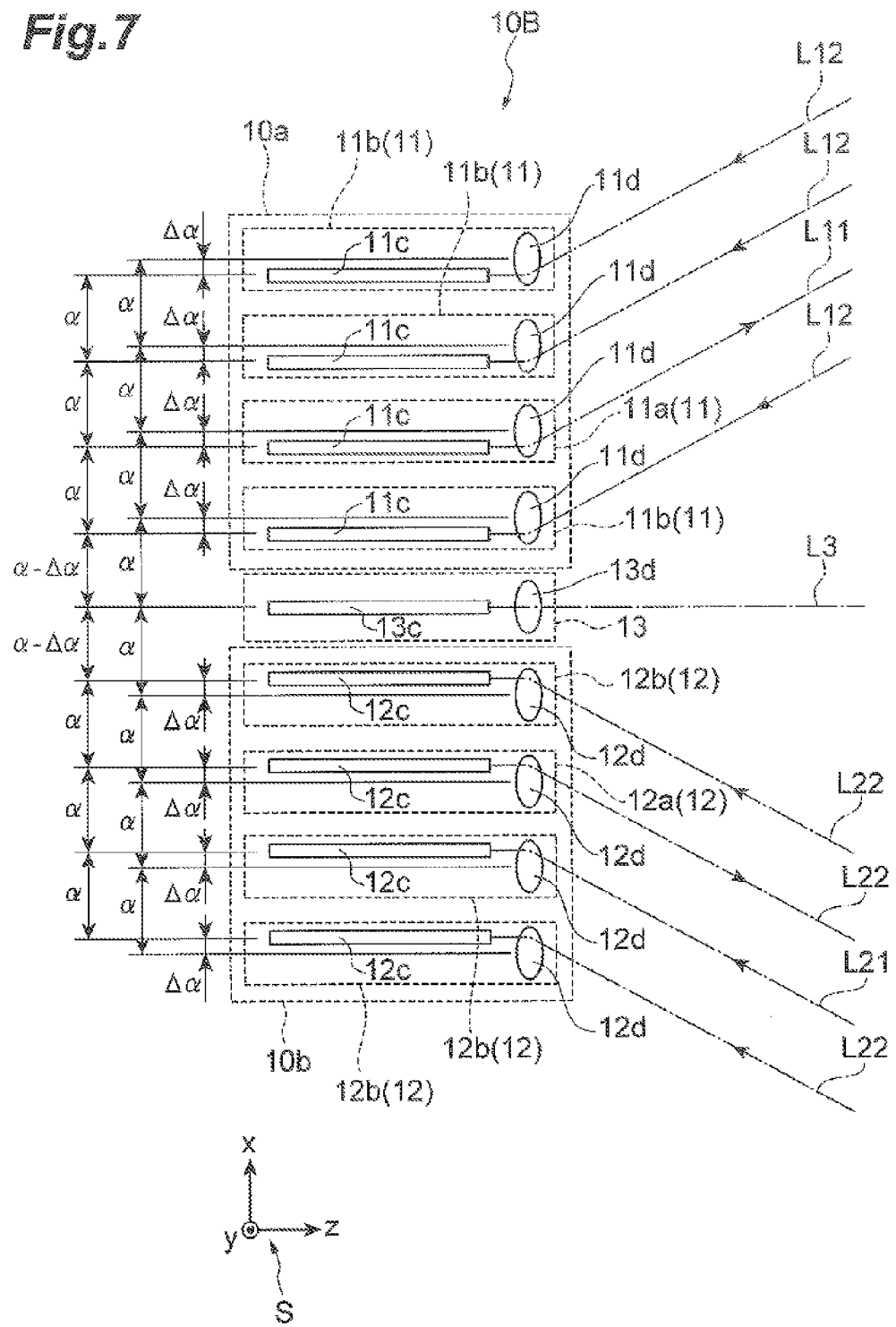
FIG. 7 is a side view schematically illustrating a configuration of a light input/output unit according to a second modified example.

FIG. 7 is a side view schematically illustrating a configuration of a light input/output unit 10B according to another modified example of the above-described first embodiment, and illustrates a form of the light input/output unit 10B viewed from the y-axis direction. In the light input/output unit 10B according this modified example, unlike the above-described embodiment (see FIG. 4), intervals between the optical fibers 11c and 12c adjacent to the optical fiber 13c and the optical fiber 13c become α−Δα. On the other hand, intervals between the light condensing elements 13d and 12c adjacent to the light condensing element 13d and the light condensing element 13d become α. That is, the optical axis of the optical fiber 11c is shifted by −Δα with respect to the optical axis of the light condensing element 11d, and the optical axis of the optical fiber 12c is shifted by Δα with respect to the optical axis of the light condensing element 12d.

As described above, in this modified example, optical fibers 11d, 12d, and 13d are mutually arranged at regular pitches and light optical fibers 11c, 12c, and 13c are mutually arranged at irregular pitches. The position of the optical fiber 11c is shifted to one side of an arrangement direction (a negative side of the x-axis) with respect to the light condensing element 11d and the position of the light optical fiber 12c is shifted to the other side of the arrangement direction (a positive side of the x-axis) with respect to the light condensing element 12d. Through the above-described configuration, as in the above-described first embodiment, even in this modified example, the light entry/exit angle in the light input/output port 11 becomes θ1 and the light entry/exit angle in the light input/output port 12 becomes −θ1. Accordingly, it is possible to preferably have the operations and effects of the above-described first embodiment.

(Third Modified Example)

Figure 8:
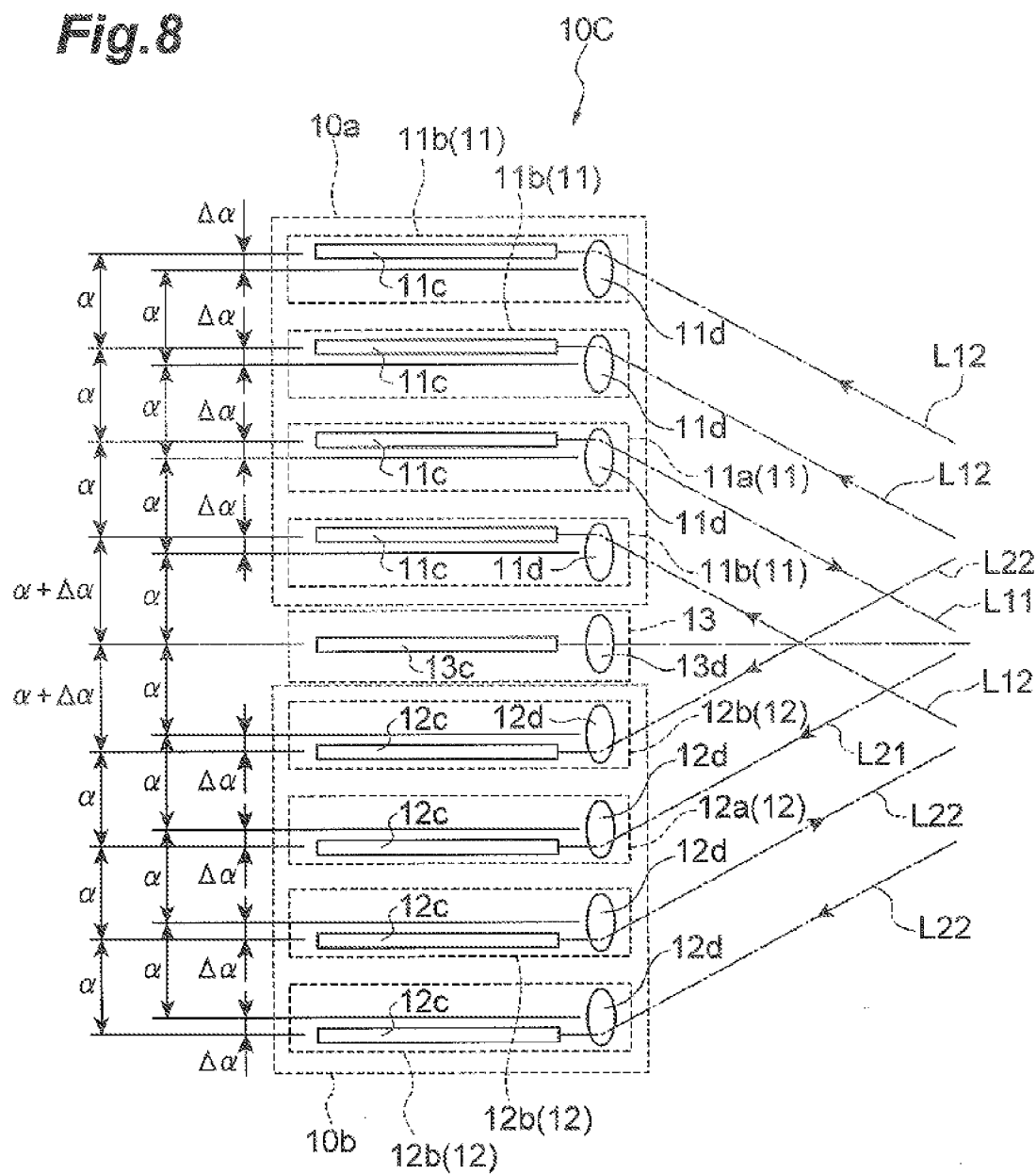
FIG. 8 is a side view schematically illustrating a configuration of a light input/output unit according to a third modified example.

FIG. 8 is a side view schematically illustrating a configuration of a light input/output unit 10C according to still another modified example of the above-described first embodiment, and illustrates a form of the light input/output unit 10C viewed from the y-axis direction. In the light input/output unit 10C according to this modified example, unlike the above-described second modified example (see FIG. 7), an optical axis of the optical fiber 11c is shifted by Δα in the positive direction with respect to the optical axis of the light condensing element 11*d*. Shift amounts Δα in three or more light input/output ports 11 are mutually equal. Thereby, a uniform negative light entry/exit angle −θ1 is assigned to the three or more light input/output ports 11.

On the other hand, the optical axis of the optical fiber 12*c* is shifted by −Δα with respect to the optical axis of the light condensing element 12*d*. Also, shift amounts Δα in three or more light input/output ports 12 are mutually equal. Thereby, a uniform positive light entry/exit angle θ1 is assigned to the three or more light input/output ports 12.

As described above, in this modified example, light condensing elements 11*d*, 12*d*, and 13*d* are mutually arranged at regular pitches and optical fibers 11*c*, 12*c*, and 13*c* are mutually arranged at irregular pitches. The position of the optical fiber 11*c* is shifted to one side of an arrangement direction (a positive side of the x-axis) with respect to the light condensing element 11*d* and the position of the optical fiber 12*c* is shifted to the other side of the arrangement direction (a negative side of the x-axis) with respect to the light condensing element 12*d*. Accordingly, because the light entry/exit angle in the light input/output port 11 becomes negative (−θ1) arid the light entry/exit angle in the light input/output port 12 located at a negative side of the x-axis with respect to the light input/output port 11 becomes positive (θ1), the entry/exit light of the light input/output port 11 and the entry/exit light of the light input/output port 12 intersect each other. Even in this form, as in the second modified example, it is possible to preferably have the operations and effects of the above-described first embodiment.

(Fourth Modified Example)

Figure 9:
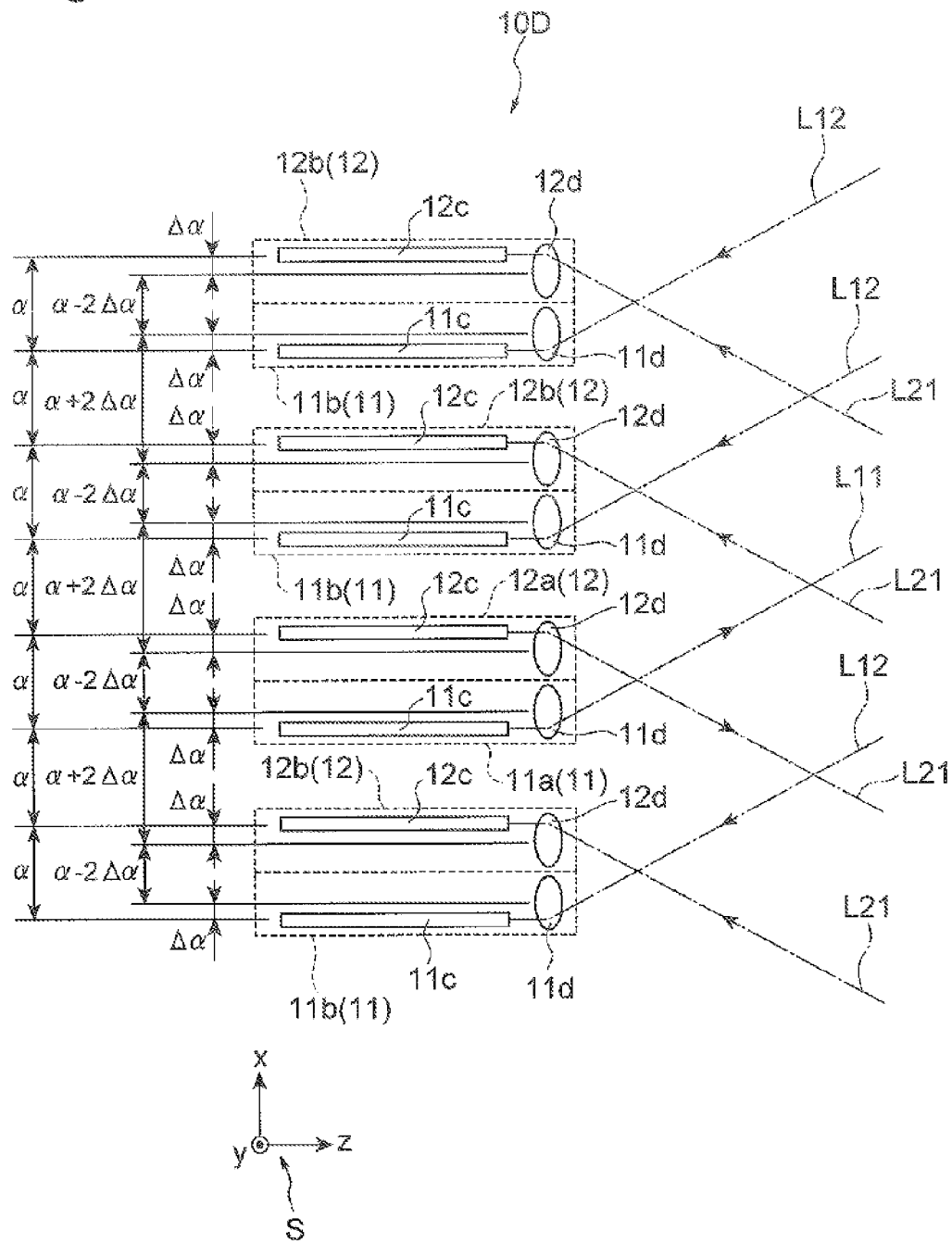
FIG. 9 is a side view schematically illustrating a configuration of a light input/output unit according to a fourth modified example.

FIG. 9 is a side view schematically illustrating a configuration of a light input/output unit 10D according to yet another modified example of the above-described first embodiment, and illustrates a form of the light input/output unit 10D viewed from the y-axis direction. In the light input/output unit 10D according to this modified example, unlike the above-described embodiment (see FIG. 4), a first light input/output port 11 and a second light input/output port 12 are alternately disposed side by side in the x-axis direction.

Specifically, an optical fiber 11*c* and a light condensing element 11*d* constituting the light input/output port 11 and an optical fiber 12*c* and a light condensing element 12*d* constituting the light input/output port 12 are alternately disposed side by side in the x-axis direction. While optical fibers 11*c*, 12*c*, and 13*c* are mutually arranged at regular pitches (intervals α), the light condensing element 11*d* and the light condensing element 12*d* adjacent in an x-axis positive side with respect to the light condensing element 11*d* are disposed at an interval (α−2Δα) and the light condensing element 12*d* and the light condensing element 11*d* adjacent in an x-axis positive side with respect to the light condensing element 12*d* are disposed at an interval (α+2Δα).

As described above, in this modified example, optical fibers 11*c*, 12*c*, and 13*c* are mutually arranged at regular pitches and light condensing elements 11*d*, 12*d*, and 13*d* are mutually arranged at irregular pitches. As in the above-described embodiment, the position of the light condensing element 11*d*, is shifted to one side of an arrangement direction (a positive side of the x-axis) with respect to the optical fiber 11*c* and the position of the light condensing element 12*d* is shifted to the other side of the arrangement direction (a negative side of the x-axis) with respect to the optical fiber 12*c*. Accordingly, the light entry/exit angle in the light input/output port 11 becomes positive (θ1) and the light entry/exit angle in the light input/output port 12 becomes negative (−θ1). Because the light input/output ports 11 and 12 are alternately disposed side by side in this modified example, the entry/exit light of the light input/output port 11 and the entry/exit light of the light input/output port 12 intersect each other. Even in this form, it is possible to preferably have the operations and effects of the above-described first embodiment.

(Fifth Modified Example)

Figure 10:
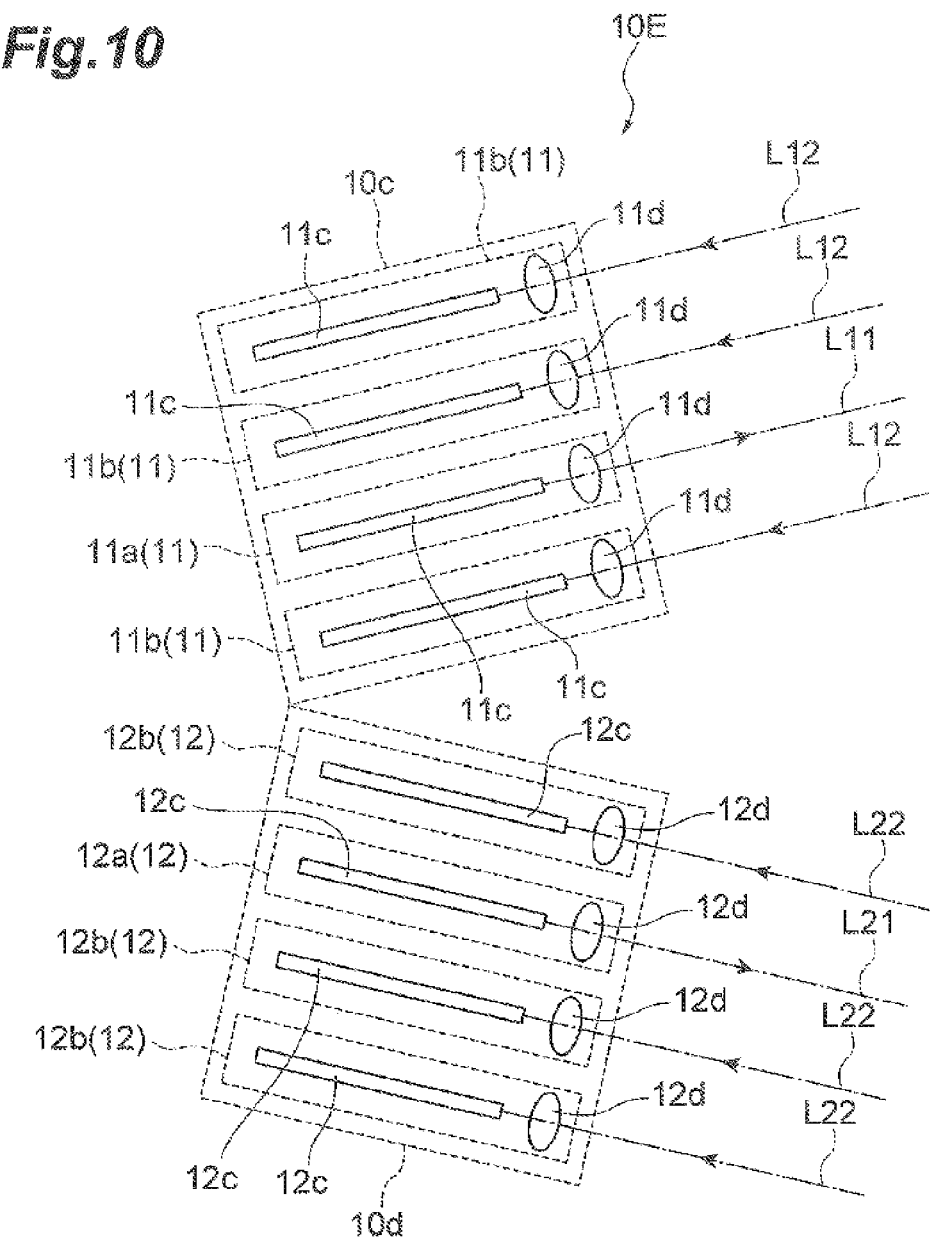
FIG. 10 is a side view schematically illustrating a configuration of a light input/output unit according to a fifth modified example.
Figure 11:
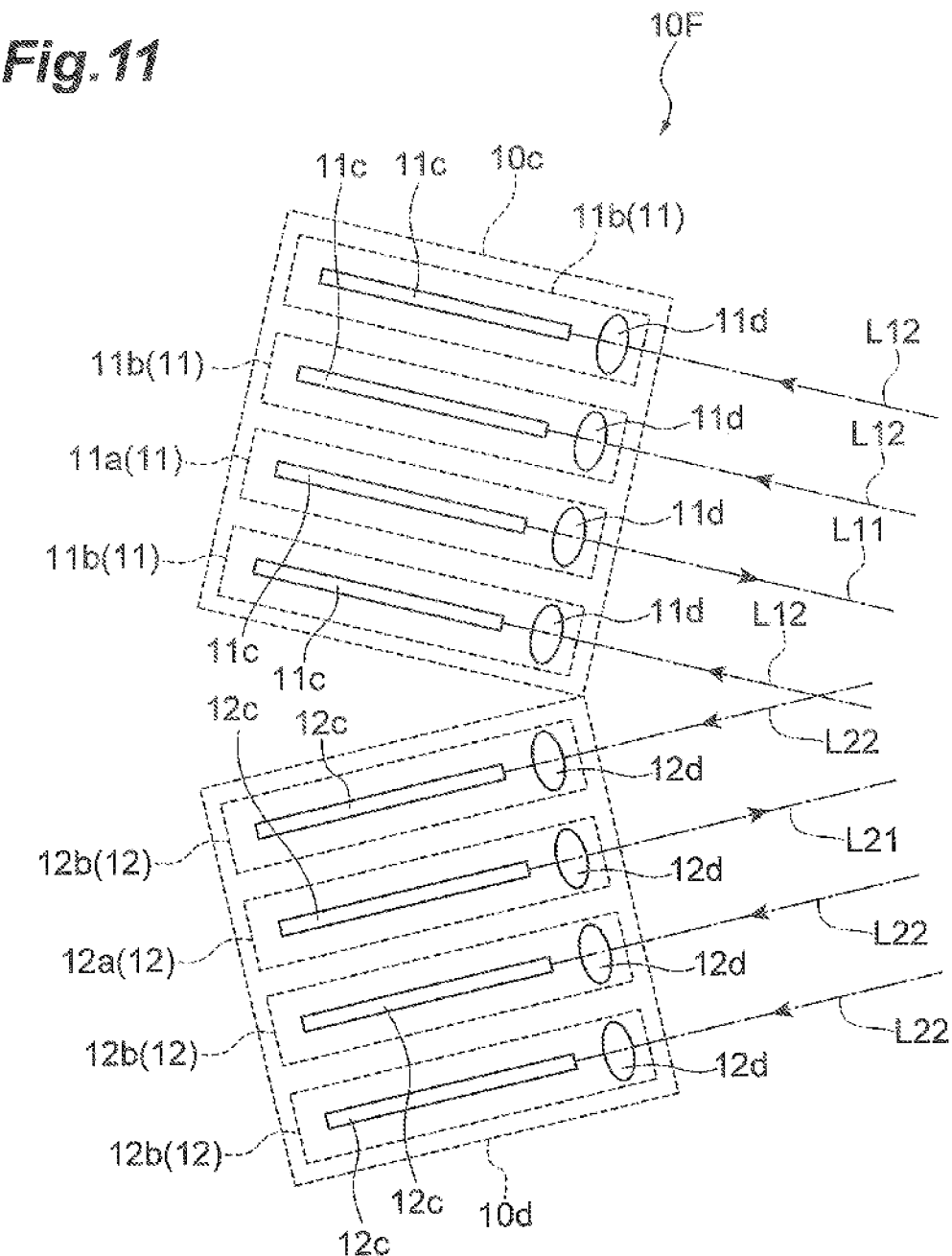
FIG. 11 is a side view schematically illustrating a configuration of the light input/output unit according to the fifth modified example.

FIGS. 10 and 11 are side views schematically illustrating configurations of light input/output units 10E and 10F according to yet another modified example of the above-described first embodiment, and illustrate forms of the light input/output units 10E and 10F viewed from the y-axis direction. In the light input/output units 10E and 10F according to this modified example, unlike the first embodiment (see FIG. 4), the optical axes of the optical fibers 11*c* and 12*c* mutually match the optical axes of the light condensing elements 11*d* and 12*d* in the light input/output port 11 of the first portion 10*c* and the light input/output port 12 of the second portion 10*d*.

In addition, in this modified example, the optical axes of the optical fiber 11*c* and the light condensing element 11*d* of the light input/output port 11 are inclined in the x-axis direction with respect to the predetermined axis C. For example, in the light input/output unit 10E illustrated in FIG. 10, the optical axes of the optical fiber 11*c* and the light condensing element 11*d* are inclined in the x-axis positive direction. In addition, in the light input/output unit 10F illustrated in FIG. 11, the optical axes of the optical fiber 11*c* and the light condensing element 11*d* are inclined in an x-axis negative direction. Thereby, the entry and exit of light of the light input/output port 11 (that is, the exit of light L11 from the light input port 11*a* and the entry of the wavelength component L12 to the light output port 11*b*) are performed even in the optical axis inclined in the x-axis direction with respect to the predetermined axis C.

The optical axes of the optical fiber 12*c* and the light condensing element 12*d* of the light input/output port 12 are also inclined in the x-axis direction with respect to the predetermined axis C. For example, in the light input/output unit 10E illustrated in FIG. 10, the optical axes of the optical fiber 12*c* and the light condensing element 12*d* are inclined in the x-axis negative direction. Also, in the light input/output unit 10F illustrated in FIG. 11, the optical axes of the optical fiber 12*c* and the light condensing element 12*d* are inclined in the x-axis negative direction. Thereby, the entry and exit of light of the light input/output port 12 (that is, the exit of light L12 from the light input port 12*a* and the entry of the wavelength component L21 for the light output port 12*b*) are performed even in the optical axis inclined in the x-axis direction with respect to the predetermined axis C.

Even in the form as in this modified example, it is possible to preferably have the operations and effects of the above-described first embodiment. In addition, because the optical fibers 11*c* and 12*c* and the light condensing elements 11*d* and 12*d* are arranged at regular pitches and their axes match according to this modified example, the optical design and fabrication are facilitated.

(Sixth Modified Example)

FIGS. 12 to 15 are side views schematically illustrating configurations of light input/output units 10G to 10J according to yet another modified example of the above-described first embodiment and illustrate forms of the light input/output units 10G to 10J viewed from the y-axis direction. In the light input/output units 10G to 10J according to this modified example, unlike the first embodiment (see FIG. 4), normal lines of end surfaces of optical fibers 11e and 12e are inclined in the x direction with respect to optical axes of the optical fibers 11e and 12e (that is, central axes of cores of the optical fibers 11e and 12e) in the light input/output ports 11 of first portions 10e and 10g and the light input/output ports 12 of second portions 10f and 10h. In other words, the end surfaces of the optical fibers 11e and 12e are inclined in the x direction with respect to a plane vertical to the optical axes of the optical fibers 11e and 12e. Therefore, the optical axes of the entry/exit light L11, L12, L21, and L22 of the optical fibers 11e and 12e have certain angles of refraction within an xz plane with respect to the optical fibers 11e and 12e. Also, core regions (that is, light entry/exit points) of end surfaces of the optical fibers 11e and 12e are disposed side by side on a straight line orthogonal to the predetermined axis C (a straight line along the x-axis in this modified example).

Figure 12:
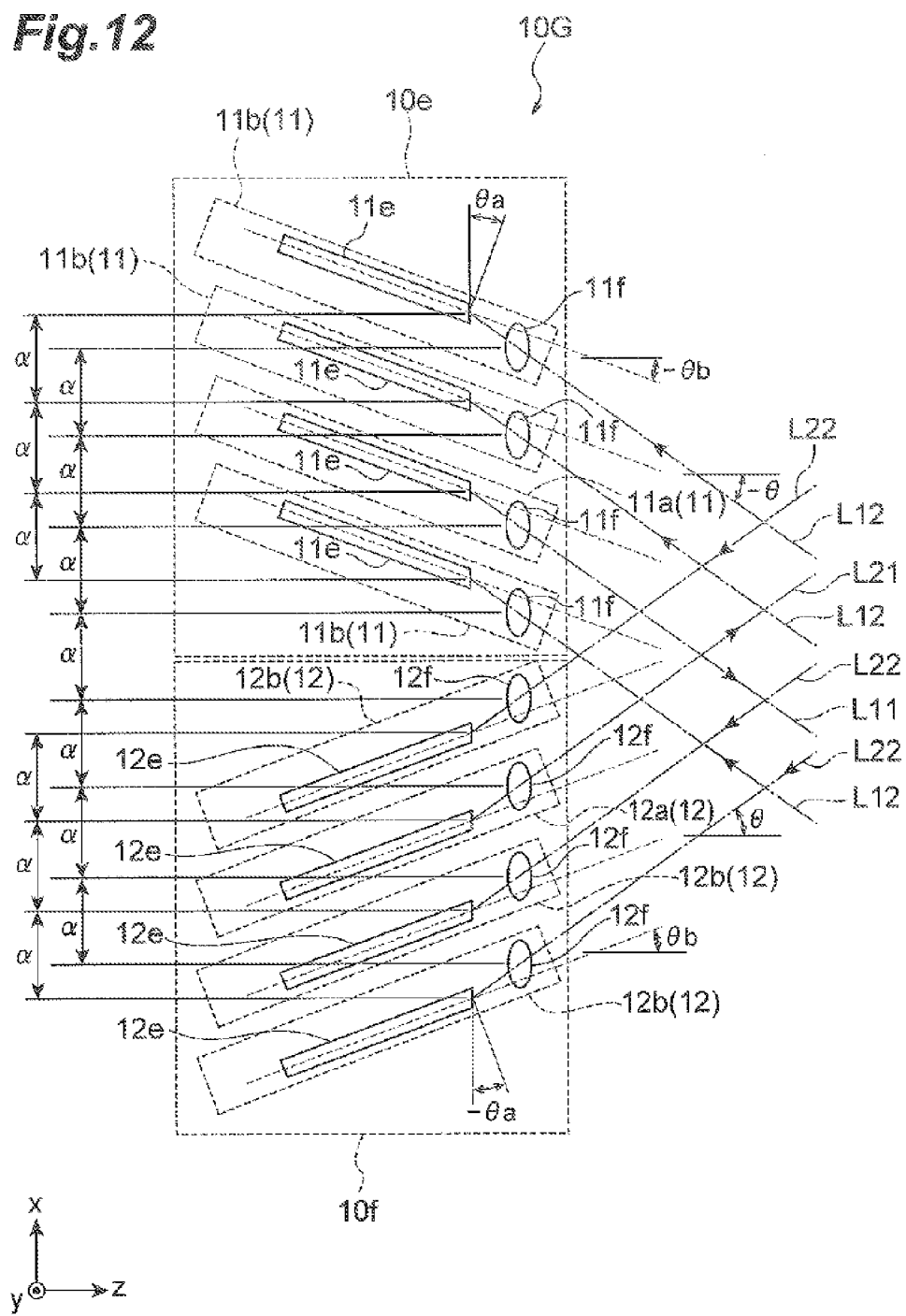
FIG. 12 is a side view schematically illustrating a configuration of a light input/output unit according to a sixth modified example.
Figure 13:
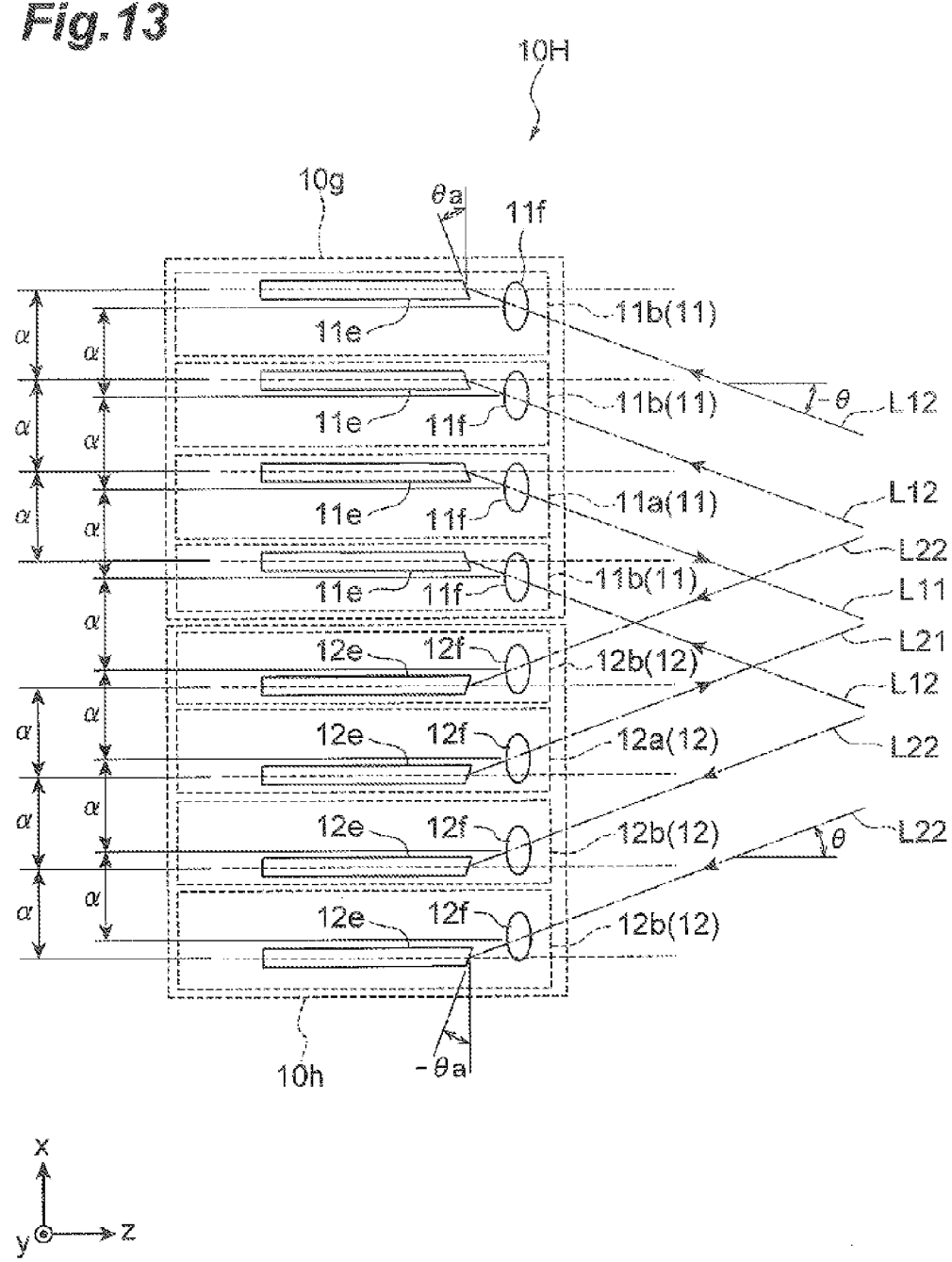
FIG. 13 is a side view schematically illustrating a configuration of the light input/output unit according to the sixth modified example.

For example, in the light input/output units 10G and 10H illustrated in FIGS. 12 and 13, angles of end surfaces of optical fibers 11e of the first portions 10e and 10g become θa and entry/exit light L11 and L12 of the optical fibers 11e is refracted in a direction close to the entry/exit light L21 and L22 of the second portions 10f and 10h. On the other hand, angles of end surfaces of the optical fibers 12e of the second portions 10f and 10h become −θa and entry/exit light L21 and L22 of the optical fibers 12e is refracted in a direction close to the entry/exit light L11 and L12 of the first portions 10e and 10g. That is, in this modified example, optical axes of the light L11 and L12 which enters or exits an end surface of the optical fiber 11e of the light input/output port 11 and optical axes of the light L21 and L22 which enters or exits an end surface of the optical fiber 12e of the light input/output port 12 are directed in directions close to each other by refraction in the end surfaces of the optical fibers 11e and 12e.

In addition, angles (−θ and θ) formed by the optical axes of light L11, L12, L21, and L22 which enter or exit end surfaces of the optical fibers 11e and 12e with respect to the predetermined axis C and angles formed by optical axes of light condensing elements 11f and 12f with respect to the predetermined axis C are different from each other in an xz plane in the light input/output units 10G and 10H. Also, in an embodiment, the optical axes of the light condensing elements 11f and 12f may be parallel to the predetermined axis C.

Even in the form as in this embodiment, it is possible to preferably have the operations and effects of the above-described first embodiment. In addition, in the light input/output units 10G and 10H according to this modified example, optical axes of the light L11 and L12 which enters or exits end surfaces of the optical fibers 11e and 12e are inclined with respect to the optical axes of the light condensing elements 11f and 12f. Thereby, returning light generated by reflecting the light L11 and L21 exiting from the light input/output ports 11 and 12 in an optical component (the relay optical system 41 or the like) constituting the previous-stage optical system can be coupled to the light input/output ports 11 and 12 and prevented from becoming stray light. In addition, because it is possible to align an exit direction of light exiting from the light input/output ports 11 and 12 and equalize an optical path length until the light reaches the previous-stage optical system, it is possible to improve optical path control precision in the wavelength selective switch 1A and prevent optical loss from occurring.

In addition, in the light input/output units 10G and 10H, an angle +θa at which the optical axis of the optical fiber 11e in the first portions 10e and 10g is inclined with respect to the optical axis of the light condensing element 11f and an angle −θa at which the optical axis of the optical fiber 12e in the second portions 10f and 10h is inclined with respect to the optical axis of the light condensing element 12f are different from each other. Further, a relative positional relation between the optical fiber 11e and the light condensing element 11f is set so that the light L11 and L12 entering or exiting the optical fibers 11e passes through the optical axis of the light condensing element 11f within the light condensing element 11f. Likewise, a relative positional relation between the optical fiber 12e and the light condensing element 12f is set so that the light L21 and L22 entering or exiting the optical fibers 12e passes through the optical axis of the light condensing element 12f within the light condensing element 12f.

Thereby, the light input/output units 10G and 10H can receive or emit light L11, L12, L21, and L22 while preventing optical paths of the light L11, L12, L21, and L22 entering or exiting the optical fibers 11e and 12e from being changed in the light condensing elements 11f and 12f. Thereby, alignment of the optical fiber 11e and the light condensing element 11f and alignment of the optical fiber 12e and the light condensing element 12f can be easily performed.

Also, in the light input/output unit 10G illustrated in FIG. 12, the optical axis of the optical fiber 11e is inclined in the x direction by −θb with respect to the predetermined axis C. In addition, the optical axis of the optical fiber 12e is inclined in the x direction by θb with respect to the predetermined axis C. On the other hand, in the light input/output unit 10H illustrated in FIG. 13, the optical axes of the optical fibers 11e and 12e are along the predetermined axis C. As described above, the optical axis directions of the optical fibers 11e and 12e may be inclined with respect to the predetermined axis C or maybe along the predetermined axis C.

In addition, end surface inclination angles of the optical fibers 11e and 12e are set so that optical axes of the light L11 and L12 entering or exiting the optical fibers 11e and optical axes of the light L21 and L22 entering or exiting the optical fibers 12e are closer to each other in the light input/output units 10G and 10H. Thereby, because the light condensing element 11f of the first portion 10e or 10g can be closer to the light condensing element 12f of the second portion 10f or 10h, the sizes of the light input/output units 10G and 10H can be reduced. In addition, it is also possible to use a lens array in which a plurality of lenses are arranged at regular pitches (intervals α) as the light condensing elements 11f and 12f. Further, because the light input/output unit 10G is disposed so that the optical fibers 11e and 12e are disposed to be far from each other on opposite sides of the light condensing elements 11f and 12f, it is possible to prevent the optical fibers 11e and 12e from interfering with each other. Because configurations of the light input/output units 10G and 10H as described above are facilitated, cost reduction becomes possible.

Figure 14:
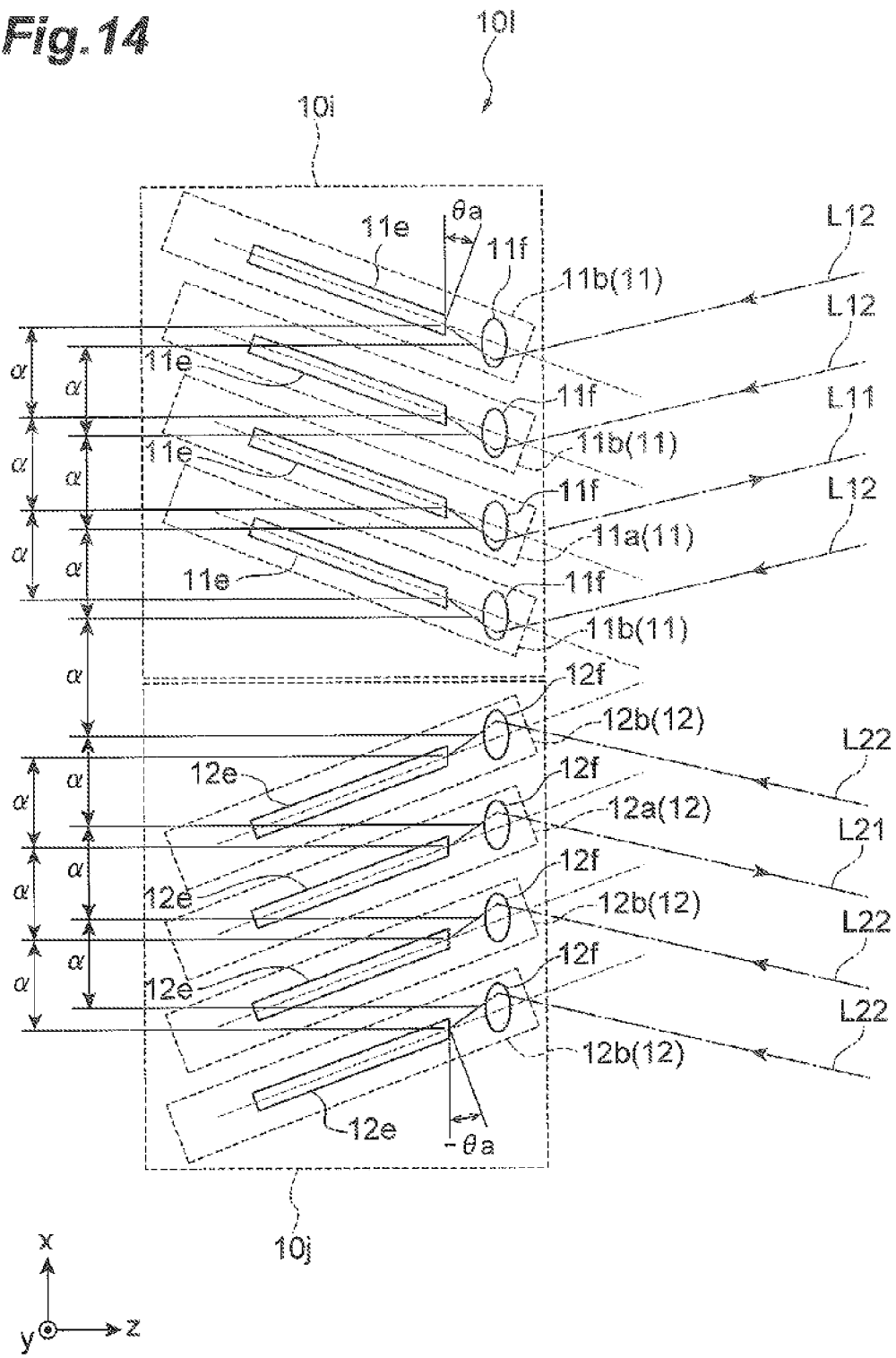
FIG. 14 is a side view schematically illustrating a configuration of the light input/output unit according to the sixth modified example.

FIG. 14 is a diagram illustrating another form of this modified example. A difference between a light input/output unit 10I illustrated in FIG. 14 and the light input/output unit 10G illustrated in FIG. 12 is a relative positional relation between the optical fibers 11e and 12e and the light condensing elements 11f and 12f. That is, in the light input/output unit 10I illustrated in FIG. 14, the relative positional relation between the optical fiber 11e and the light condensing element 11f is set so that the light L11 and L12 entering or exiting the optical fibers 11e of a first portion 10i passes through a position shifted by a predetermined distance from the optical axis of the light condensing element 11f within the light condensing element 11f to a second portion 10j. Thereby, the optical axes of the light L11 and L12 are refracted in a direction separated from the entry/exit light L21 and L22, in the light condensing element 11f. Likewise, the relative positional relation between the optical fiber 21e and the light condensing element 21f is set so that the light L21 and L22 entering or exiting the optical fibers 12e of the first portion 10j passes through a position shifted by a predetermined distance from the optical axis of the light condensing element 21f within the light condensing element 21f to the first portion 10i. Thereby, the optical axes of the light L21 and L22 are refracted in a direction separated from the entry/exit light L11 and L12, in the light condensing element 12f.

For example, as in the light input/output unit 10I illustrated in FIG. 14, the light L11, L12, L21, and L22 entering or exiting the optical fibers 11e and 12e may pass through a position shifted from the optical axes of the light condensing elements 11f and 12f within the light condensing elements 11f and 12f. Thereby, angles of the light L11, L12, L21, and L22 entering or exiting the optical fibers 11e and 12e can be adjusted to desired angles by the light condensing elements 11f and 12f. Also, as in the light input/output unit 10I illustrated in FIG. 14, the light L11 and L12 passes through a position shifted from the optical axis of the light condensing element 11f to the second portion 10j and the light L21 and L22 passes through a position shifted from the optical axis of the light condensing element 12f to the first portion 10i, so that the size of the light input/output unit 10I can be reduced. In addition, it is also possible to use a lens array in which a plurality of lenses are arranged at regular pitches (intervals α) as the light condensing elements 11f and 12f. Further, because the light input/output unit 10I is disposed so that the optical fibers 11e and 12e are disposed to be far from each other on opposite sides of the light condensing elements 11f and 12f, it is possible to prevent the optical fibers 11e and 12e from interfering with each other. Because configuration of the light input/output unit 10I as described above is facilitated, cost reduction becomes possible. Also, even in a form as in the light input/output unit 10I, it is possible to preferably have the operations and effects of the above-described first embodiment.

Figure 15:
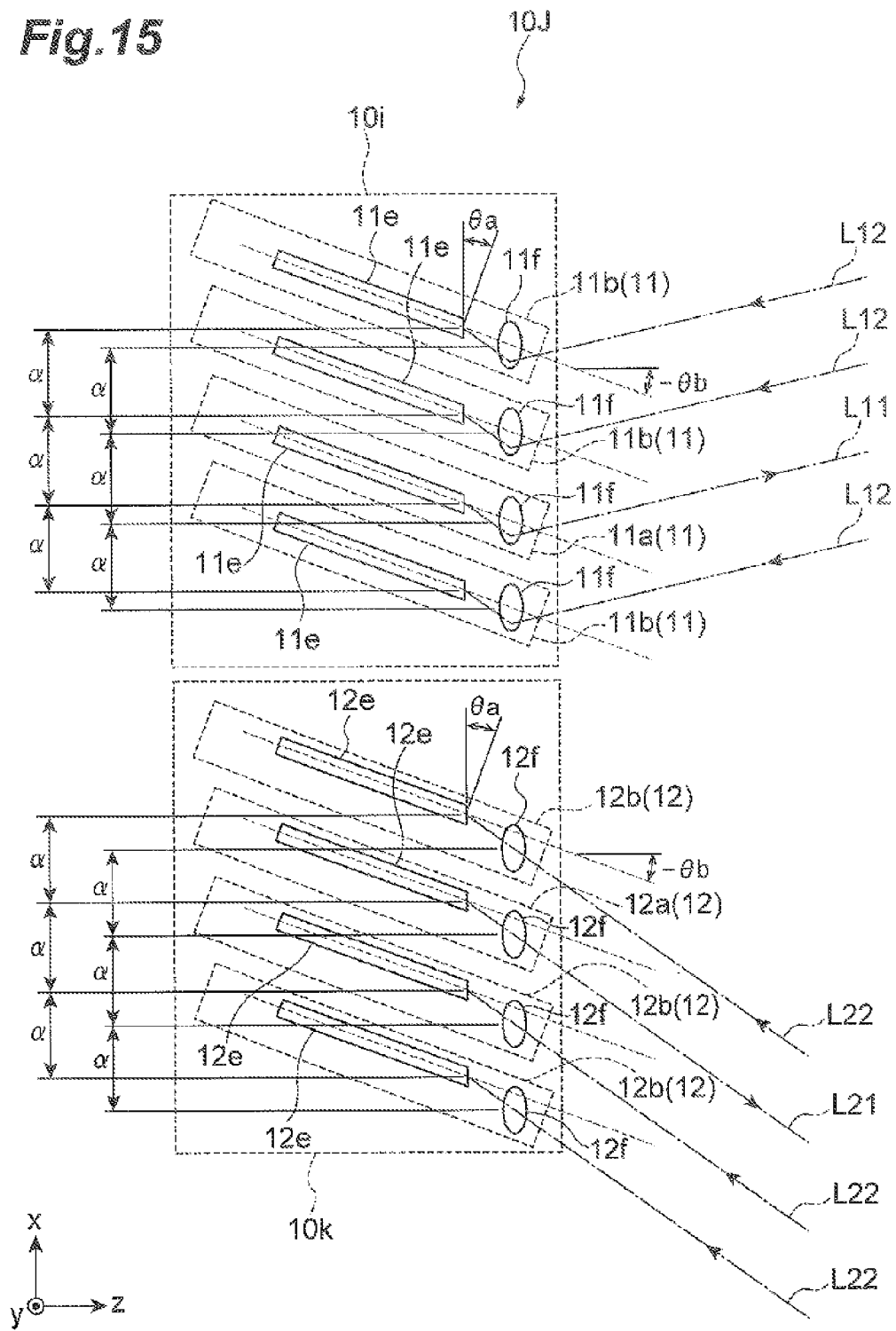
FIG. 15 is a side view schematically illustrating a configuration of the light input/output unit according to the sixth modified example.

FIG. 15 is a diagram illustrating still another form of this modified example. A configuration of a first portion 10i of a light input/output unit 10J illustrated in FIG. 15 is the same as a configuration of the first portion 10i of the light input/output unit 10I illustrated in FIG. 14. In addition, a second portion 10k of the light input/output unit 10J is configured so that inclination directions of the light L21 and L22 are reverse of those in the second portion 10g of the light input/output unit 10G illustrated in FIG. 12. That is, in the second portion 10k of the light input/output unit 10J, the normal line of the end surface of the optical fiber 12e is inclined by θa in the x-direction with respect to the optical axis of the optical fiber 12e. In other words, the end surface of the optical fiber 12e of the second portion 10k is inclined by the same angle θa in the same direction as the end surface of the optical fiber 11e of the first portion 10i. Further, the optical axis of the optical fiber 12e is inclined by the same angle −θb in the same direction as the optical axis of the optical fiber 11e with respect to the predetermined axis C.

However, in the second portion 10k, a relative positional relation between the optical fiber 12e and the light condensing element 12f is set so that the light L21 and L22 entering or exiting the optical fibers 12e passes through the optical axis of the light condensing element 12f within the light condensing element 12f. Accordingly, optical paths of the light L21 and L22 do not change in the light condensing element 12f. Accordingly, optical paths of the light L21 and L22 extend in directions separated from the light L11 and L12. That, is, in the light input/output unit 10J, optical axes of the light L11 and L12 and optical axes of the light L21 and L22 are directed in directions separated from each other.

As in the light input/output unit 10J illustrated in FIG. 15, the optical fiber 11e of the first portion 10i and the optical fiber 12e of the second portion 10k may be inclined by the same angle −θb. Even in this case, for example, angles of the light L11 and L12 can be preferably different from angles of the light L21 and L22 by adjusting relative positions of the light condensing elements 11f and 12f with respect to the optical fibers 11e and 12e (shift amounts of the light L11, L12, L21, and L22 with respect to the optical axes of the light condensing elements 11f and 12f). It is possible to preferably have the operations and effects of the above-described first embodiment.

(Second Embodiment)

Figure 16:
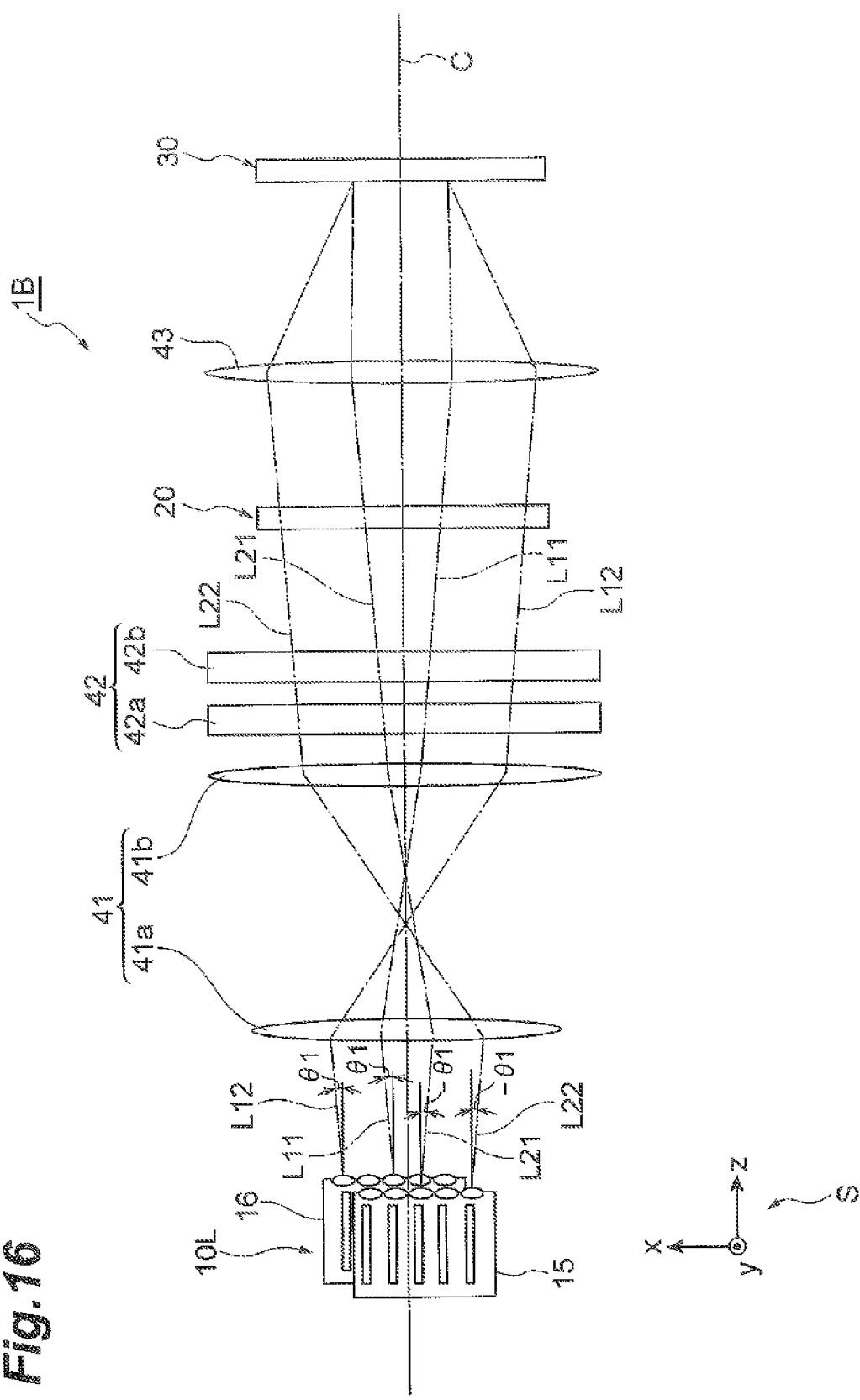
FIG. 16 is a schematic diagram illustrating a configuration of a wavelength selective switch according to a second embodiment.
Figure 17:
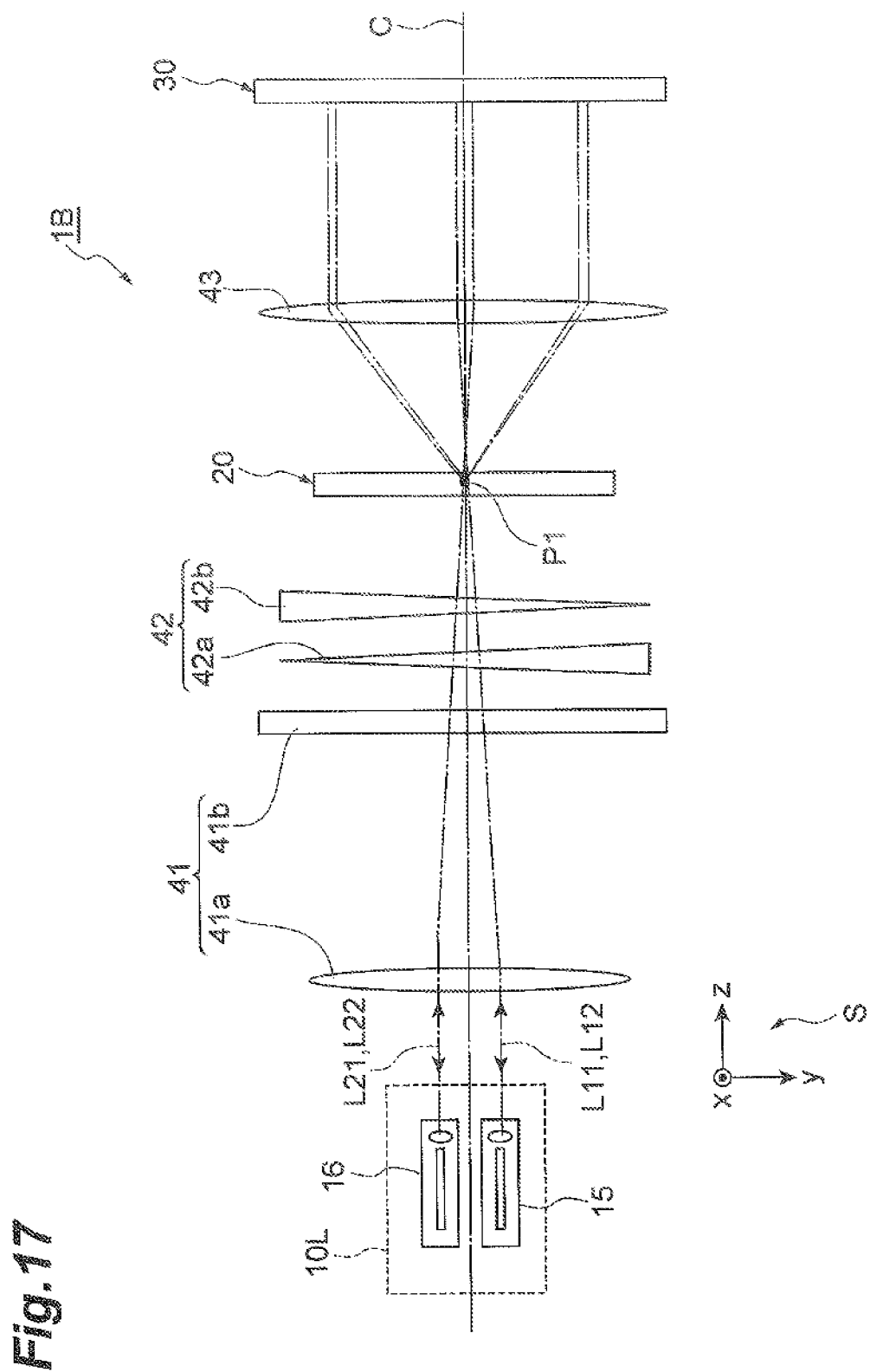
FIG. 17 is a schematic diagram illustrating a configuration of the wavelength selective switch according to the second embodiment.

FIGS. 16 and 17 are schematic diagrams illustrating a configuration of a wavelength selective switch 1B according to the second embodiment. FIG. 16 is a side view of the wavelength selective switch 1B viewed from a y-axis direction of an orthogonal coordinate system S, and illustrates a schematic configuration of the wavelength selective switch 1B in a plane including an x-axis and a z-axis. FIG. 17 is a top view of the wavelength selective switch 1B viewed from an x-axis direction of the orthogonal coordinate system S and illustrates a schematic configuration of the wavelength selective switch 1B in a plane including the y-axis and the z-axis.

As illustrated in FIGS. 16 and 17, the wavelength selective switch 1B includes a light input/output unit 10L, a relay optical system 41, and an anamorphic optical system 42, a dispersive element 20, a light condensing lens 43, and a light deflection element 30 disposed side by side on a predetermined axis C. Also, although the predetermined axis C is linearly drawn in FIGS. 16 and 17, the predetermined axis C may be bent, for example, by disposing the reflection mirror or the like in the middle.

Figure 18:
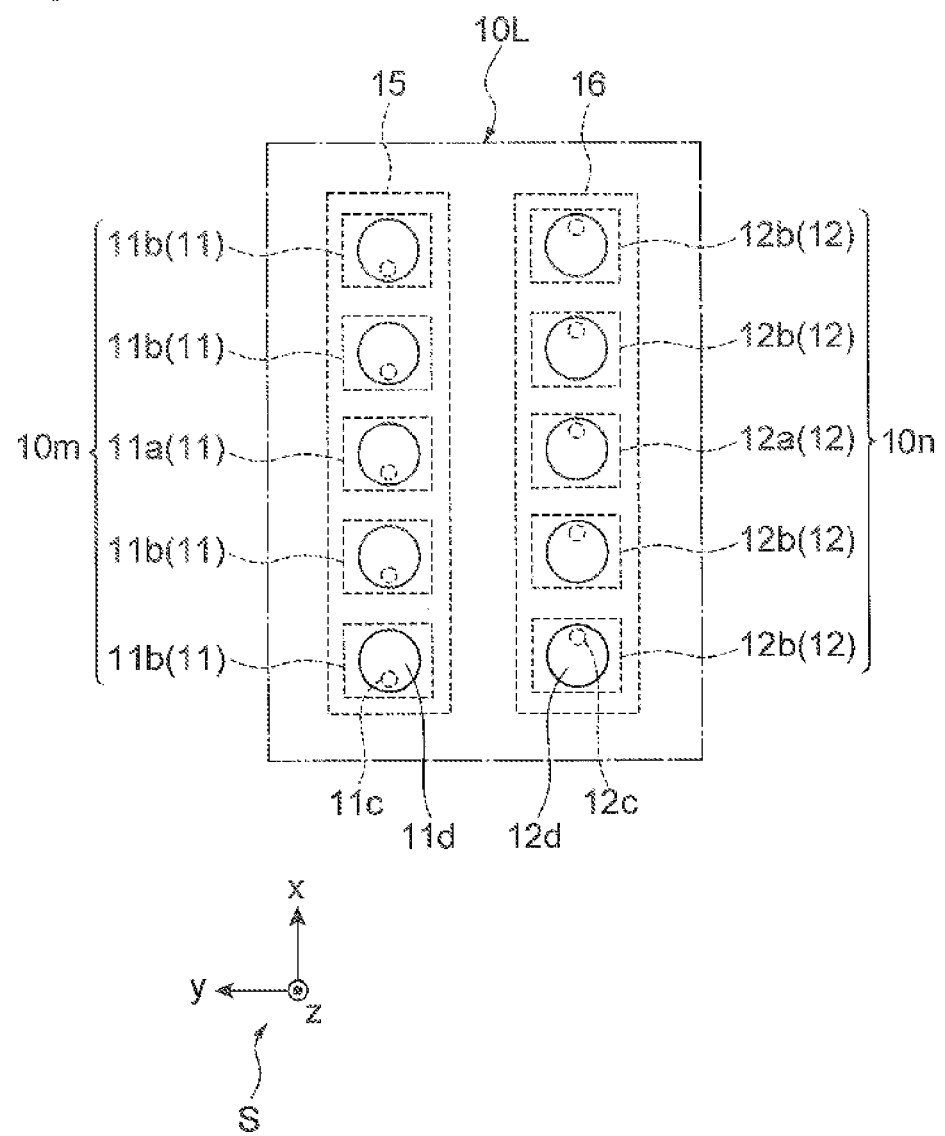
FIG. 18 is a diagram illustrating a configuration of a light input/output unit viewed from a z-axis direction.
Figure 19:
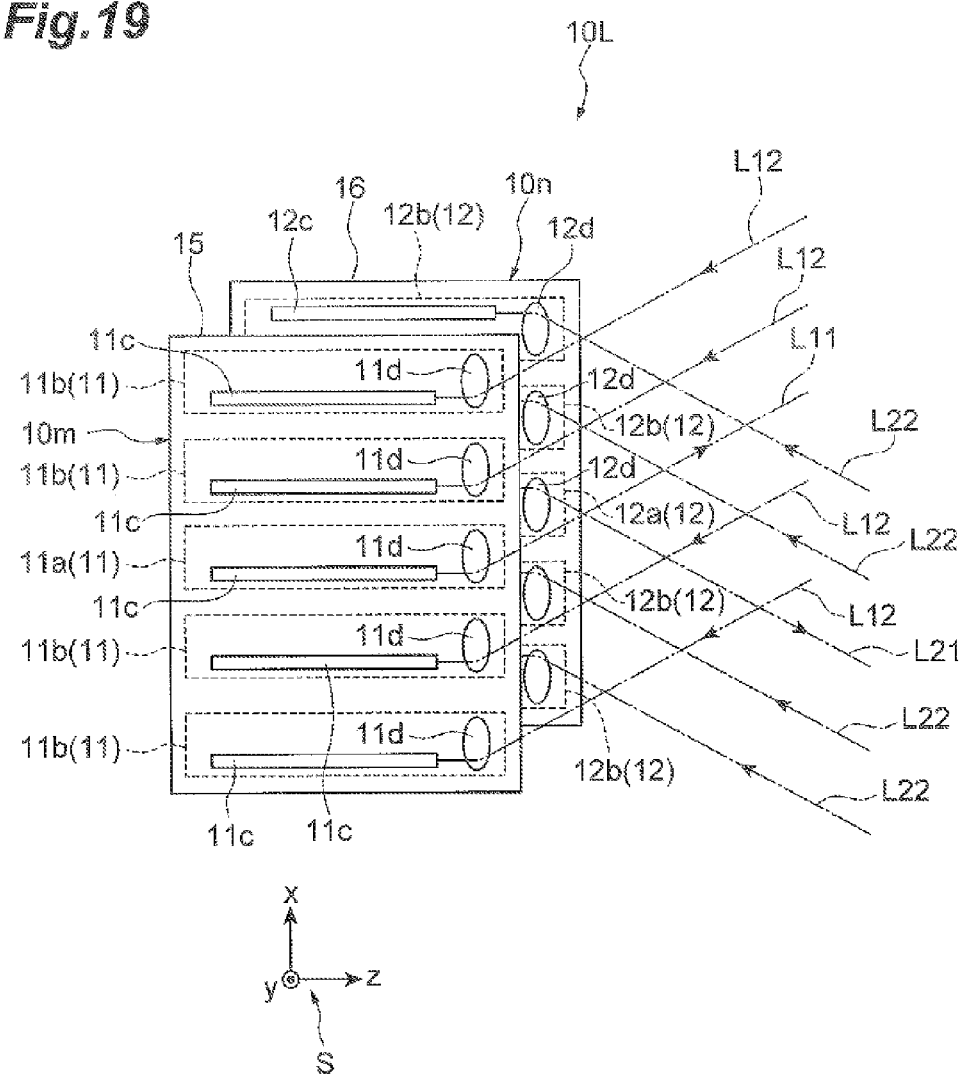
FIG. 19 is a diagram schematically illustrating a configuration of the light input/output unit.

FIG. 18 is a diagram illustrating a configuration of a light input/output unit 10L viewed from a direction (z-axis direction) of the predetermined axis C. In addition, FIG. 19 is a diagram schematically illustrating a configuration of the light input/output unit 10L viewed from the y-axis direction. As illustrated in FIGS. 18 and 19, the light input/output unit 10L has a first portion 10m including three or more first light input/output ports 11 and a second portion 10n including three or more second light input/output ports 12. Some light input/output ports (all light input/output ports 11 in this embodiment) and the remaining light input/output ports (all light input/output ports 12 in this embodiment) among the three or more light input/output ports 11 and the three or more light input/output ports 12 are disposed side by side in a direction (for example, a y-axis direction) intersecting the predetermined axis C and the x-axis direction. In other words, the first portion 10m and the second portion 10n are disposed side by side in the y-axis direction.

The light input/output port 11 of the first portion 10m is included in a first column 15 aligned in the x-axis direction. In addition, the light input/output port 12 of the second portion 10n is included in a second column 16 aligned in the x-axis direction. The second column 16 is disposed side by side in the y-axis direction with respect to the first column 15. Detailed configurations of the light input/output ports 11 and 12 are similar to the first embodiment, the first modified example, the second modified example, or the third modified example described above.

Referring to FIG. 17 again, in this embodiment, light L11 from the light input port 11a, a wavelength component L12 directed from the light deflection element 30 to the light output port 11b, light L21 from the light input port 12a, and a wavelength component L22 directed from the light deflection element 30 to the light output port 12b pass through the same position (a position P1 of the drawing) of the dispersive element 20 in the y-axis direction. Through the above-described configuration, light can be preferably transmitted and received between the light input port 11a and the light output port 11b included in the first column 15 (or the light input port 12a and the light output port 12b) because the light L11 and the wavelength component L12 (or the light L21 and the wavelength component L22) follow the same optical path when viewed from the x-axis direction. For example, a previous-stage optical system (the relay optical system 41 and the anamorphic optical system 42) has light power at which the light L11 and the wavelength component L12 and the light L21 and the wavelength component L22 pass through the position P1 in the y-axis direction, so that the above-described configuration is preferably implemented.

According to a wavelength selective switch 1B of this embodiment, as in the wavelength selective switch 1A of the first embodiment, a predetermined angle is assigned to an optical axis of entry/exit light in each of the first light input/output port 11 and the second light input/output port 12 of the light input/output unit 10L. Therefore, according to the wavelength selective switch 1B of this embodiment, it is possible to suppress the number of components and separate (or couple) more wavelength components without excessively lengthening an optical path length.

In addition, in this embodiment, some light input/output ports (first column 15) among the light input/output ports 11 and 12 and the remaining light input/output ports (second column 16) are disposed side by side in the y-axis direction. Thereby, because it is possible to shorten an interval between the light input/output ports located at both ends of the x-axis direction as compared with the case in which the light input/output ports 11 and 12 are arranged in one column as in the first embodiment, it is possible to suppress a maximum deflection angle required by the light deflection element 30. Thereby, for example, when the light deflection element 30 is an LCOS type phase modulation element, it is possible to increase the precision of a deflection angle.

In addition, in this embodiment, all the light input/output ports 11 are included in some light input/output ports described above and all the light input/output ports 12 are included in the remaining light input/output ports described above. Thereby, it is possible to completely separate an optical path from the light input port 11a to the light output port 11b and an optical path from the light input port 12a to the light output port 12b and reduce crosstalk.

Figure 20:
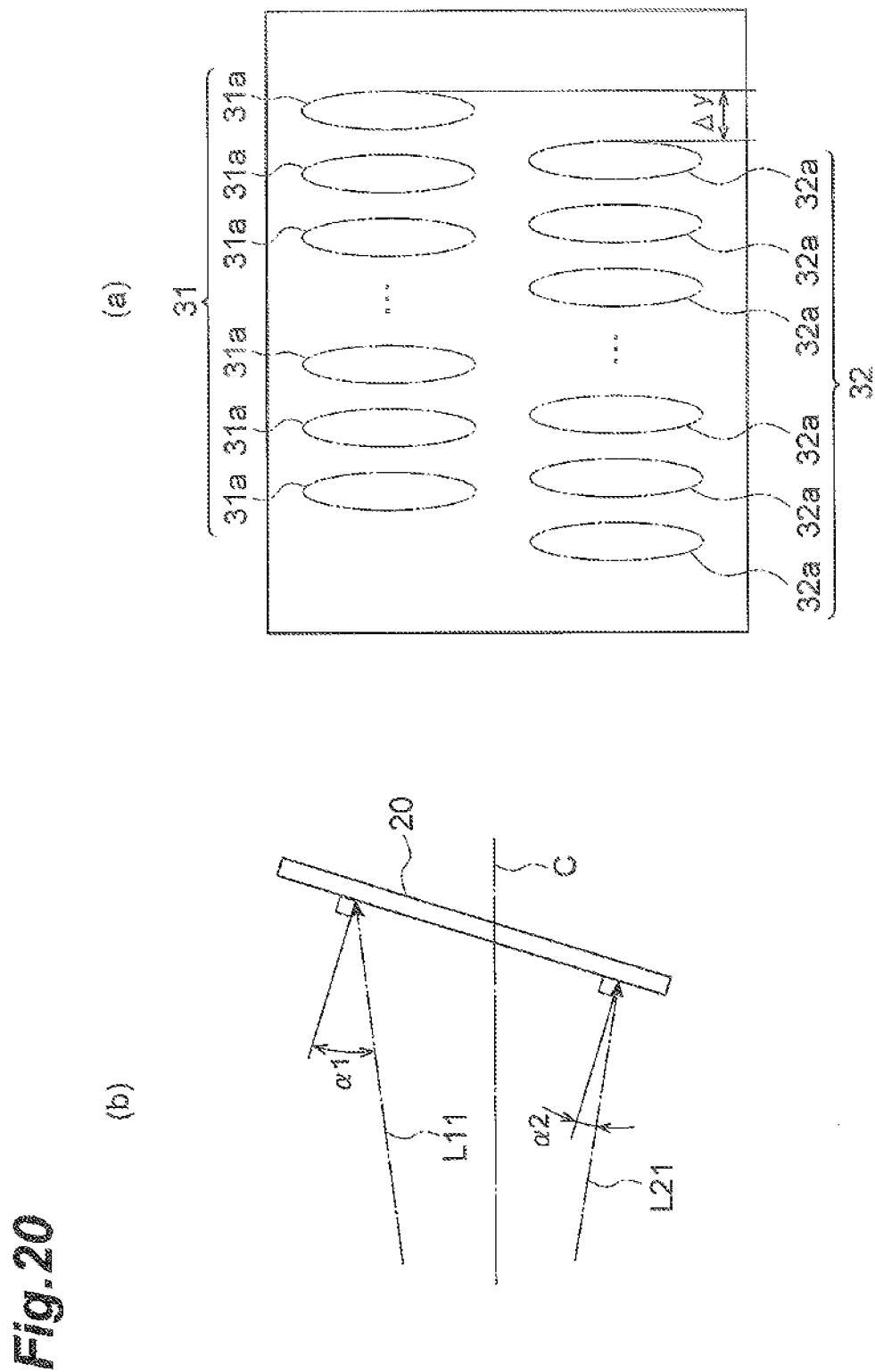
FIG. 20 is a diagram illustrating the reason that a dispersive element is inclined with respect to a predetermined axis.

In addition, in this embodiment, the light L11 and L12 and the light L21 and L22 pass through the same position P1 of the dispersive element 20 in the y-axis direction. In this case, the dispersive element 20 may be inclined in the x-axis direction with respect to the predetermined axis C. This reason will be described below with reference to FIG. 20. FIG. 20(a) is a front view of the light deflection element 30 viewed from the direction of the predetermined axis C. FIG. 20(b) is a side view illustrating a state in which the light L11 and L12 enters the dispersive element 20.

In this embodiment, the light L11 and L21 from the first column 15 and the second column 16 mutually arranged in the y-axis direction (that is, having positions different from each other in the y-axis direction) enters the same position P1 in the y-axis direction. Therefore, the light entry angles of the light L11 and L21 within the yz plane for the dispersive element 20 may be slightly different. Because spectral characteristics of the dispersive element 20 depend upon the light entry angle within a spectral plane (within the yz plane in this embodiment), the angles of the optical axes in the light L11 and L21 after spectral separation consequently differ even in light of the same wavelength. That is, as illustrated in FIG. 20(a), a first light deflection portion 31 and a second light deflection portion 32 are shifted, for example, by Δy, in the y-axis direction.

Here, when the dispersive element 20 is an element having a diffraction grating structure, a light exit angle β of the wavelength component exiting from the dispersive element 20 is represented by the following formula if a light entry angle of light to the dispersive element 20 in the yz plane is set as α.

$$\sin \beta = \{m\lambda/(d \cdot \cos \epsilon)\} - \sin \alpha$$

Here, m is the diffraction order of the dispersive element 20, d is a pitch of the diffraction grating of the dispersive element, λ is a wavelength of entry light for the dispersive element 20, and ε is a light entry angle of light to the dispersive element 20 within the xz plane. As is apparent from this formula, the light exit angle β depends upon the cosine of the light entry angle ε in the xz plane as well as a light entry angle α within the yz plane. The cosine of the light entry angle ε increases/decreases according to an increase/decrease of the absolute value of ε regardless of a negative/positive value of ε. That is, because the light entry angle α1 of one piece of light (for example, light L11) increases and its cosine decreases if the dispersive element 20 is inclined within the xz plane as illustrated in FIG. 20(b), the light exit angle β of the wavelength component increases based on the above formula. In addition, because the light entry angle α2 of the other piece of light (for example, light L21) decreases and its cosine increases, the light exit angle β of the wavelength component decreases based on the above formula. As a result, the shift amount Δy illustrated in FIG. 20(a) can decrease.

Also, a form in which the dispersive element 20 is not inclined with respect to the predetermined axis C is also possible. In this case, because positions at which light of the same wavelength is coupled in the light L12 reflected in the first light deflection portion 31 and light L22 reflected in the second light deflection portion 32 can be far away from each other, it is possible to reduce crosstalk.

(Third Embodiment)

Figure 21:
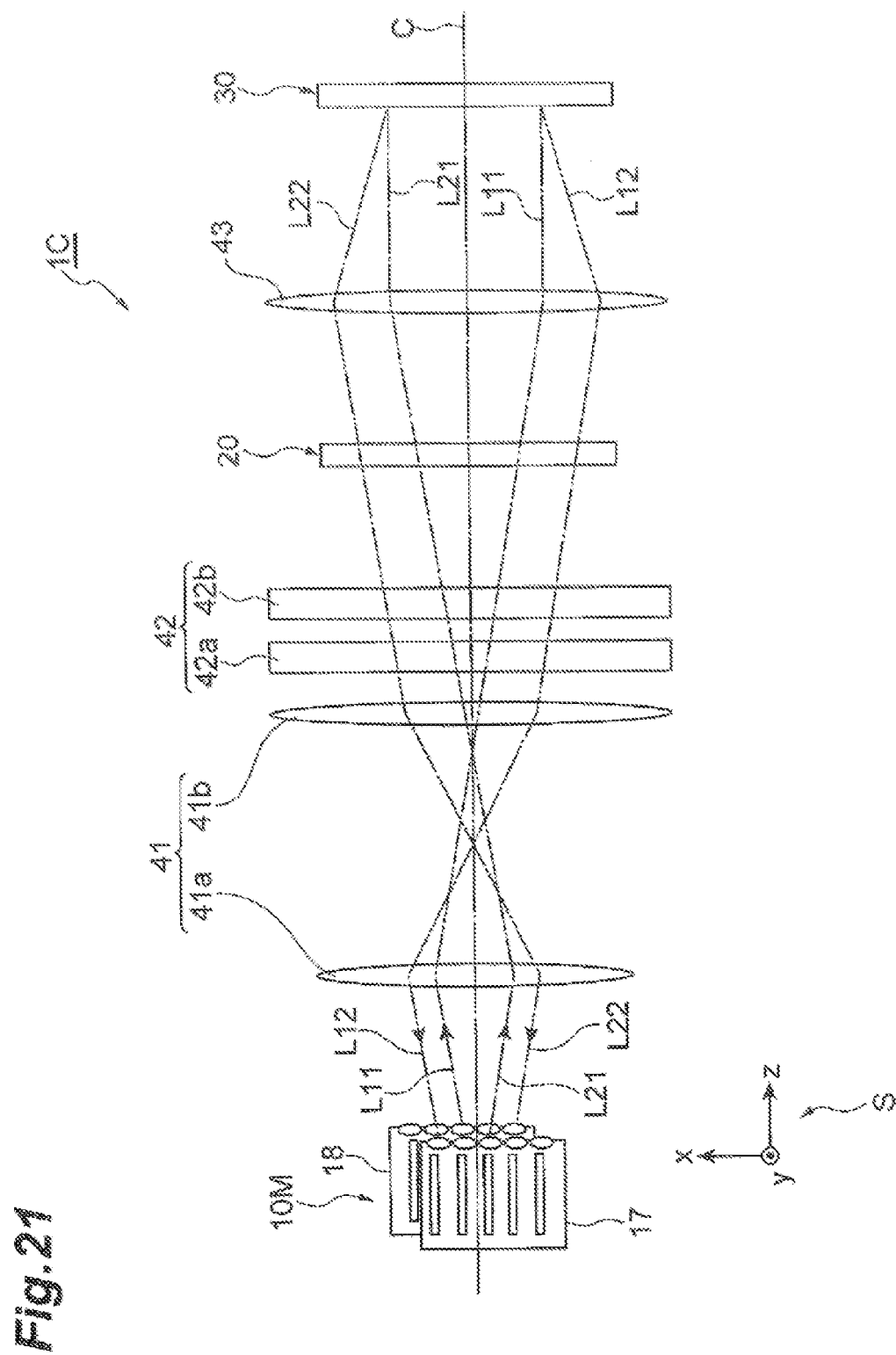
FIG. 21 is a schematic diagram illustrating a configuration of a wavelength selective switch according to a third embodiment.
Figure 22:
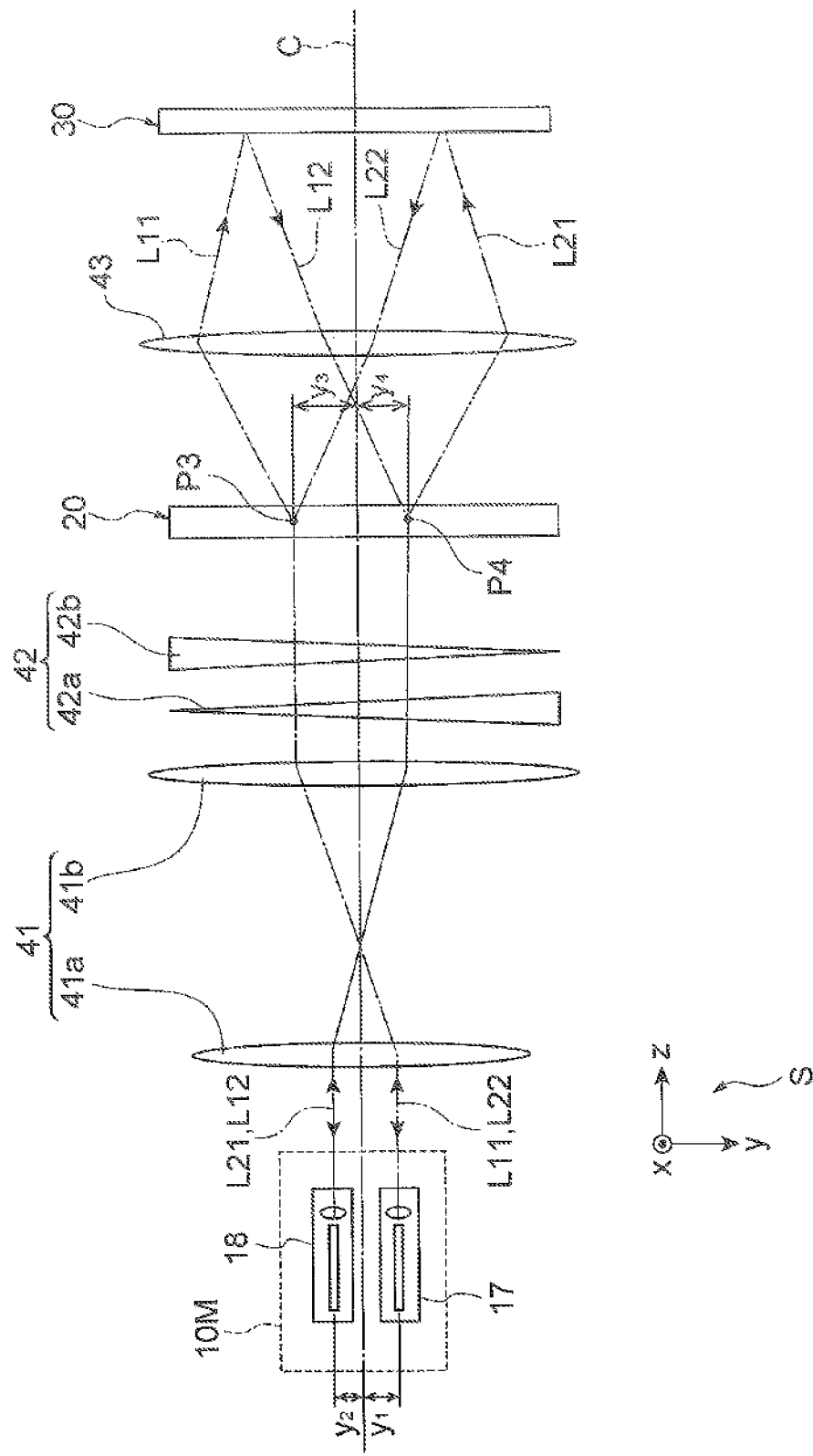
FIG. 22 is a schematic diagram illustrating a configuration of the wavelength selective switch according to the third embodiment.

FIGS. 21 and 22 are schematic diagrams illustrating a configuration of a wavelength selective switch 1C according to the third embodiment. FIG. 21 is a side view of the wavelength selective switch 1C viewed from a y-axis direction of an orthogonal coordinate system S, and illustrates a schematic configuration of the wavelength selective switch 1C in a plane including an x-axis and a z-axis. FIG. 22 is a top view of the wavelength selective switch 1C viewed from an x-axis direction of the orthogonal coordinate system S and illustrates a schematic configuration of the wavelength selective switch 1C in a plane including the y-axis and the z-axis.

As illustrated in FIGS. 21 and 22, the wavelength selective switch 1C includes a light input/output unit 10M, a relay optical system 41, and an anamorphic optical system 42, a dispersive element 20, a light condensing lens 43, and a light deflection element 30 disposed side by side on a predetermined axis C. Also, although the predetermined axis C is drawn in a straight line in FIGS. 21 and 22, the predetermined axis C may be bent, for example, by disposing the reflection mirror or the like in the middle.

Figure 23:
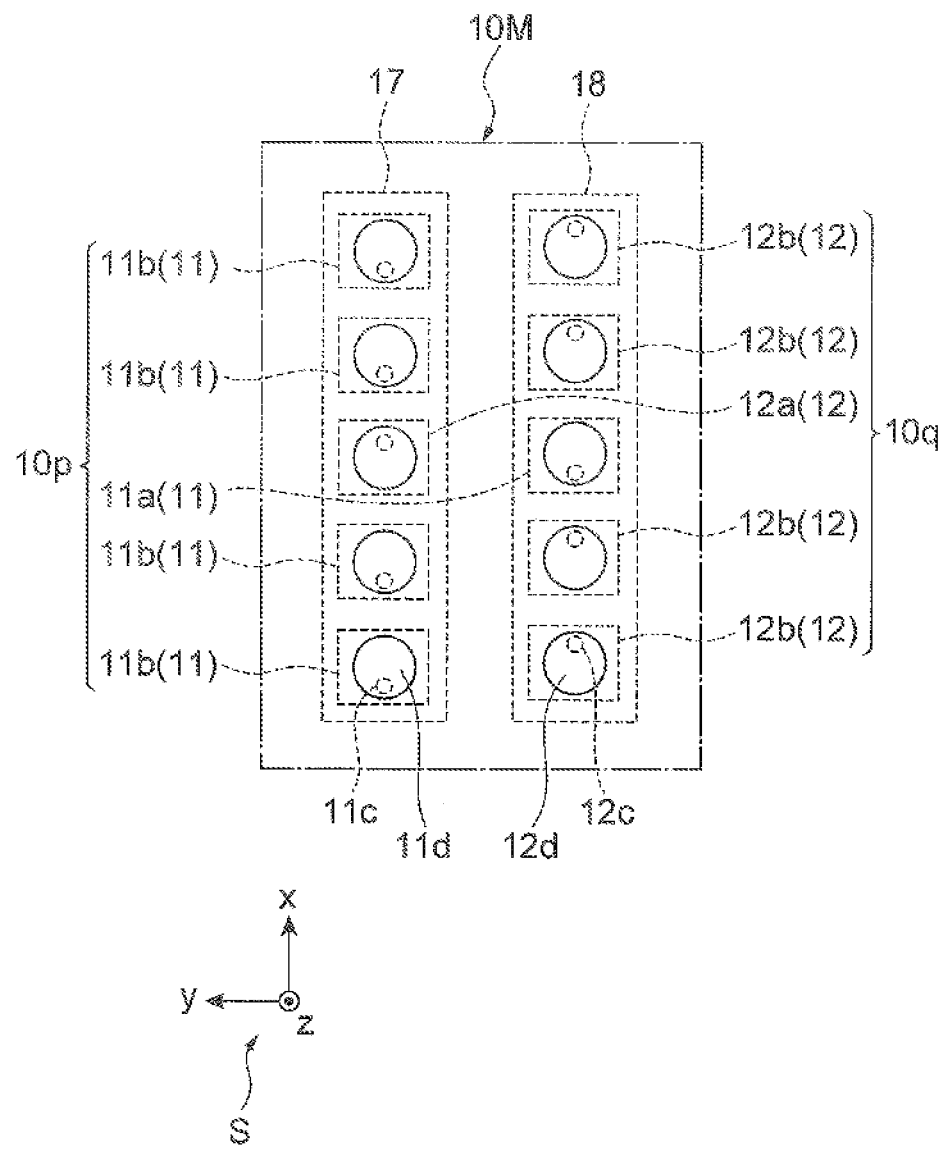
FIG. 23 is a diagram illustrating a configuration of a light input/output unit viewed from a z-axis direction.
Figure 24:
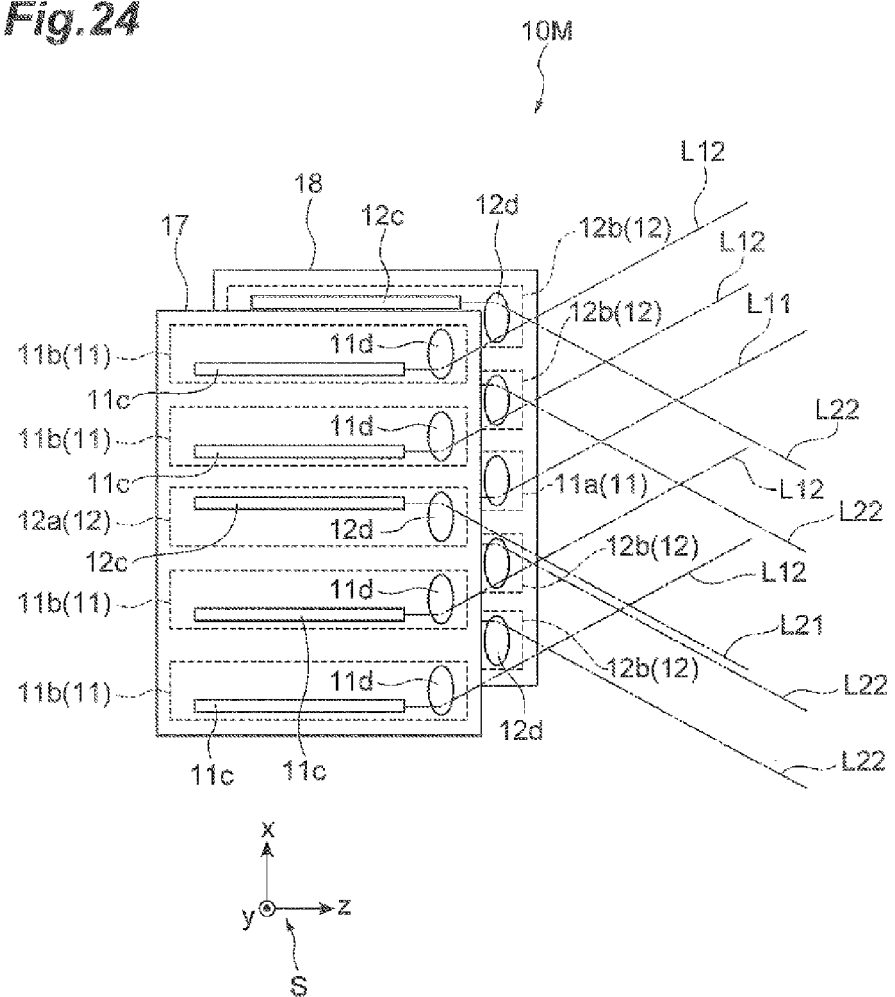
FIG. 24 is a diagram schematically illustrating a configuration of the light input/output unit.

FIG. 23 is a diagram illustrating a configuration of a light input/output unit 10M viewed from a direction (z-axis direction) of the predetermined axis C. In addition, FIG. 24 is a diagram schematically illustrating a configuration of the light input/output unit 10M viewed from the y-axis direction. As illustrated in FIG. 23, the light input/output unit 10M has a first portion 10p including three or more first light input/output ports 11 and a second portion 10q including three or more second light input/output ports 12. Some light input/output ports (a light input port 11a and a light output port 12b in this embodiment) among the three or more light input/output ports 11 and the three or more light input/output ports 12 and the remaining light input/output ports (a light input port 12a and a light output port 11b in this embodiment) are disposed side by side in a direction (for example, a y-axis direction) intersecting the predetermined axis C and the x-axis direction.

Also, the light input port 12a and the light output port 11b are included in a first column 17 aligned in the x-axis direction. Also, light input port 11a and the light output port 12b are included in a second column 18 aligned in the x-axis direction. The second column 18 is disposed side by side in the y-axis direction with respect to the first column 17. Detailed configurations of the light input ports 11a and 12a and the light output ports 11b and 12b are similar to the first embodiment, the first modified example, the second modified example, or the third modified example described above.

Referring to FIG. 22 again, in this embodiment, light L11 from the light input port 11a and a wavelength component L12 directed from the light deflection element 30 to the light output port 11b pass through different positions (positions P3 and P4 in the drawing) of the dispersive element 20 in the y-axis direction. Similarly, light L21 from the light input port 12a and a wavelength component L22 directed from the light deflection element 30 to the light output port 12b pass through different positions (positions P4 and P3 in the drawing) of the dispersive element 20 in the y-axis direction. Through the above-described configuration, light can be preferably transmitted and received between the light input port 11a and the light output port 11b (or the light input port 12a and the light output port 12b) because the light L11 and the wavelength component L12 (or the light L21 and the wavelength component L22) follow different optical paths when viewed from the x-axis direction.

Here, it is desirable to set the positions P3 and P4 in the dispersive element 20 as follows. That is, when a distance from the optical axis of the light condensing lens 43 to the position P3 is set as $y_3$, a distance from the optical axis of the light condensing lens 43 to the position P4 is set as $y_4$, a distance from the optical axis of the lens 41a to the central axis of the light input/output port of the first column 17 is set as $y_1$, and a distance from the optical axis of the lens 41a to the central axis of the light input/output port of the second column 18 is set as $y_2$ in the y-axis direction, the positions P3 and P4 may be set so that $y_1:y_3=y_2:y_4$.

For example, a previous-stage optical system (the relay optical system 41 and the anamorphic optical system 42) has light power at which the light L11 and the wavelength component L22 pass through the position P3 and the light L21 and the wavelength component L12 pass through the position P4 in the x-axis direction, so that the above-described configuration is preferably implemented. The light entry angle to the light deflection element 30 in the y-axis direction is set by the light condensing lens 43 so that the wavelength component L12 from the light input port 11a reaches the light output port 11b and the wavelength component L22 from the light input port 12a reaches the light output port 12b, and therefore the above-described configuration is preferably implemented.

According to a wavelength selective switch 1C of this embodiment, as in the wavelength selective switch 1A of the first embodiment, a predetermined angle is assigned to an optical axis of entry/exit light in each of the light input ports 11a and 11b and the light output ports 11b and 12b of the light input/output unit 10M. Therefore, according to the wavelength selective switch 1C of this embodiment, it is possible to suppress the number of components and separate (or couple) more wavelength components without excessively lengthening an optical path length.

In addition, in this embodiment, some light input/output ports (first column 17) among the light input/output ports 11 and 12 and the remaining light input/output ports (second column 18) are disposed side by side in the y-axis direction. Thereby, because it is possible to shorten an interval between the light input/output ports located at both ends of the x-axis direction as compared with the case in which the light input/output ports 11 and 12 are arranged in one column as in the first embodiment, it is possible to suppress a maximum deflection angle required by the light deflection element 30. Thereby, for example, when the light deflection element 30 is an LCOS type phase modulation element, it is possible to increase the precision of a deflection angle.

Also, even in this embodiment, as in the second embodiment, the dispersive element 20 may be inclined in the x-axis direction with respect to the predetermined axis C. Thereby, it is possible to adjust a shift amount $\Delta y$ of a first light deflection portion 31 and a second light deflection portion 32 of the light deflection element 30 in the y-axis direction.

(Seventh Modified Example)

Figure 25:
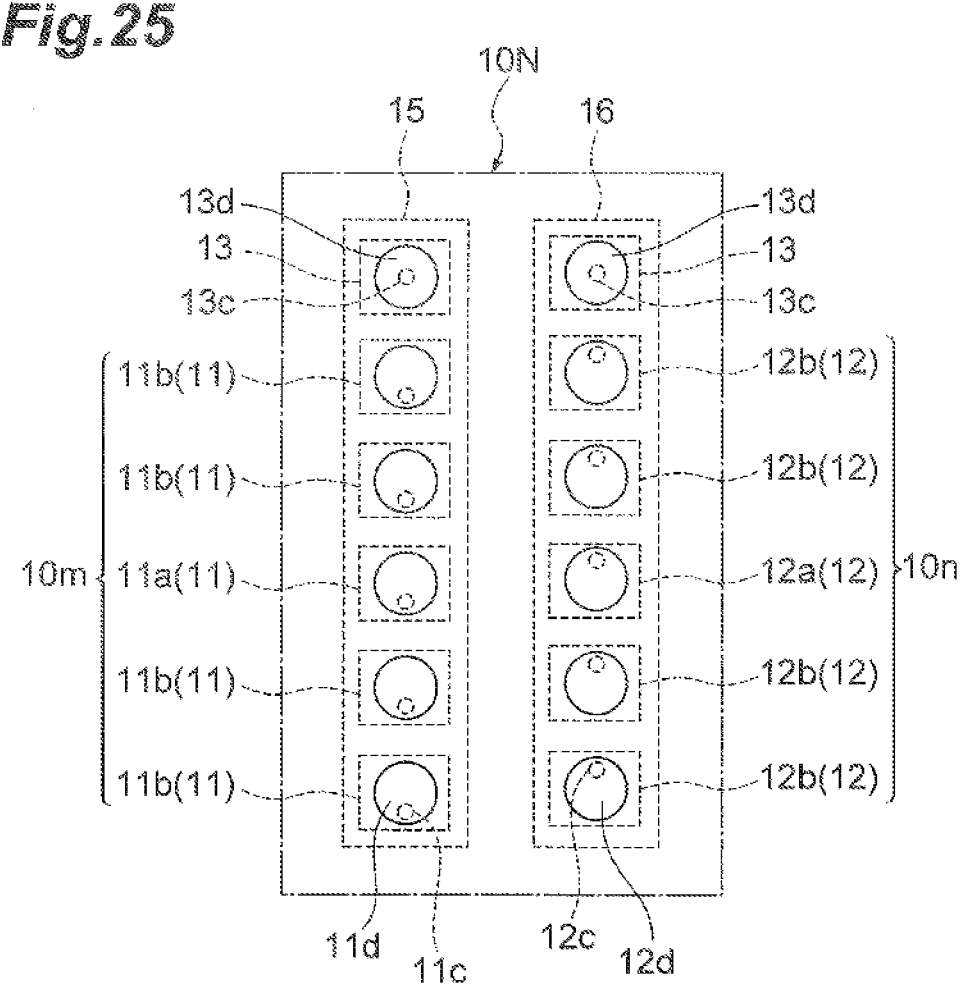
FIG. 25 is a diagram illustrating a modified example of the second embodiment.

FIGS. 25 and 26 are diagrams illustrating modified examples of the above-described second embodiment and third embodiment. FIG. 25 is a diagram illustrating a configuration of a light input/output unit 10N of this modified example viewed from the direction (z-axis direction) of the predetermined axis C. In addition, FIG. 26 is a diagram illustrating a configuration of a light input/output unit 10P of this modified example viewed from the direction (z-axis direction) of the predetermined axis C.

Each of the light input/output units 10N and 10P further includes an alignment port 13 in addition to the configuration of each of the second embodiment and the third embodiment. The alignment port 13 is a port that alignment light enters and exits by the optical axis along the predetermined axis C. Also, an internal configuration of the alignment port 13 is similar to the above-described first embodiment.

In the light input/output units 10N and 10P, some light input/output ports (first columns 15 and 17) among the three or more light input/output ports 11 and the three or more light input/output ports 12 and the remaining light input/output ports (second columns 16 and 18) are disposed side by side in the y-axis direction. At least one alignment port 13 may be provided for each of some light input/output ports and the remaining light input/output ports. In this modified example, one alignment port 13 is provided in the first columns 15 and 17 and one alignment port 13 is provided in the second columns 16 and 18.

As in this modified example, the light input/output units 10L and 10M according to the second and third embodiments may further include an alignment port 13 that alignment light enters and exits by the optical axis along the predetermined axis C separately from the light input/output ports 11 and 12. Although it is difficult to use the light input/output ports 11 and 12 for alignment because entry/exit light is inclined, it is possible to easily perform an alignment operation by separately preparing such an alignment port 13.

Other various modifications of the wavelength selective switch according to each embodiment and each modified example described above are possible. For example, although the light input/output port has been described as including the optical fiber and the light condensing lens in each embodiment and each modified example described above, the light input/output port is not limited to the above-described form. In addition, although the case in which the light input/output unit has two portions (first and second portions) with different light entry/exit angles has been described in each embodiment and each modified example described above, the light input/output unit may have three or more portions with mutually different light entry/exit angles.

INDUSTRIAL APPLICABILITY

The present invention is available as a wavelength selective switch capable of suppress the number of components and separating (or coupling) more wavelength components without excessively lengthening an optical path length

REFERENCE SIGNS LIST 1A, 1B, 1C Wavelength selective switch
10, 10A to 10P Light input/output unit
10a, 10c, 10e, 10g First portion
10b, 10d, 10f, 10h Second portion
11, 12 Light input/output port
11a, 12a Light input port
11b, 12b Light output port
11c, 12c Optical fiber
11d, 12d Light condensing element
13 Alignment port
13c Optical fiber
13d Light condensing element
15, 17 First column
16, 18 Second column
20 Dispersive element
30 Light deflection element
31, 32 Light deflection portion
31a, 32a Light deflection region
41 Relay optical system
42 Anamorphic optical system
43 Light condensing lens
C Predetermined axis

The invention claimed is:

1. A wavelength selective switch having a light input/output unit, a dispersive element, and a light deflection element disposed side by side on a predetermined axis,
wherein the light input/output unit includes:
a first portion having three or more first light input/output ports including a first light input port and a first light output port and in which light enters and exits the first light input/output port by an optical axis inclined in a first direction intersecting the predetermined axis with respect to the predetermined axis; and
a second portion having three or more second light input/output ports including a second light input port and a second light output port and in which light enters and exits the second light input/output port by the optical axis inclined in the first direction with respect to the predetermined axis,
wherein a light entry/exit angle of the first light input/output port with the predetermined axis as a reference and a light entry/exit angle of the second light input/output port with the predetermined axis as a reference differ from each other,
wherein the dispersive element is provided in common for the first and second light input/output ports, and changes an optical axis of light entering and exiting the first and second light input/output ports at an angle according to a wavelength in a direction intersecting the predetermined axis and the first direction, and
wherein the light deflection element includes:
a first light deflection portion configured to direct light from the first light input port through the dispersive element to the first light output port; and
a second light deflection portion configured to direct light from the second light input port through the dispersive element to the second light output port.

2. The wavelength selective switch according to claim 1, wherein the first and second light input/output ports include optical fibers and light condensing elements provided in a one-to-one relation to the optical fibers and optically coupled to end surfaces of the optical fibers.

3. The wavelength selective switch according to claim 2, wherein an optical axis of the optical fiber and an optical axis of the light condensing element are shifted from each other,
wherein shift amounts of an optical axis of the optical fiber and an optical axis of the light condensing element in the three or more first light input/output ports are equal to each other,
wherein shift amounts of an optical axis of the optical fiber and an optical axis of the light condensing element in the three or more second light input/output ports are equal to each other, and
wherein the shift amount in the first light input/output port and the shift amount in the second light input/output port differ from each other.

4. The wavelength selective switch according to claim 2, wherein an angle formed by an optical axis of light entering or exiting the end surface of the optical fiber with respect to the predetermined axis and an angle formed by an optical axis of the light condensing element with respect to the predetermined axis differ from each other,
wherein a normal line of the end surface of the optical fiber is inclined with respect to the optical axis of the optical fiber, and
wherein core regions of the end surfaces of the optical fibers is arranged side by side on a straight line orthogonal to the predetermined axis.

5. The wavelength selective switch according to claim 4, wherein an optical axis of light entering or exiting the end surface of the optical fiber of the first light input/output port and an optical axis of light entering or exiting the end surface of the optical fiber of the second light input/output port are directed in a mutually approaching direction.

6. The wavelength selective switch according to claim 3, wherein the first light input/output port and the second light input/output port are alternately disposed side by side in the first direction.

7. The wavelength selective switch according to claim 3,
wherein one from between the optical fibers and the light condensing elements is arranged at a regular pitch and the other is arranged at an irregular pitch,
wherein positions of the optical fibers or the light condensing elements arranged at the irregular pitch in the first light input/output port is shifted to one side of an arrangement direction with respect to the optical fibers or the light condensing elements arranged at the regular pitch in the first light input/output port, and
wherein positions of the optical fibers or the light condensing element arranged at the irregular pitch in the second light input/output port is shifted to the other side of the arrangement direction with respect to the optical fibers or the light condensing elements arranged at the regular pitch in the second light input/output port.

8. The wavelength selective switch according to claim 1, wherein some light input/output ports of the first and second light input/output ports and the remaining light input/output ports are disposed side by side in a second direction intersecting the predetermined axis and the first direction.

9. The wavelength selective switch according to claim 8,
wherein the first light input/output port is included in a first column aligned in the first direction, and
wherein the second light input/output port is included in a second column aligned in the first direction and arranged in the second direction with respect to the first column.

10. The wavelength selective switch according to claim 9, further comprising:
a previous-stage optical system disposed on the predetermined axis between the light input/output unit and the dispersive element, and
a light condensing element disposed on the predetermined axis between the dispersive element and the light deflection element,
wherein the previous-stage optical system has light power in the second direction so that entry/exit light of the first light input port and entry/exit light of the second light input port pass through the same position of the dispersive element in the second direction.

11. The wavelength selective switch according to claim 8,
wherein the first light output port and the second light input port are included in a first column aligned in the first direction, and
wherein the first light input port and the second light output port are included in a second column aligned in the first direction and arranged in the second direction with respect to the first column.

12. The wavelength selective switch according to claim 11, further comprising:
a previous-stage optical system disposed on the predetermined axis between the light input/output unit and the dispersive element, and
a light condensing element disposed on the predetermined axis between the dispersive element and the light deflection element,
wherein the previous-stage optical system has light power in the second direction so that light from the first light input port and light directed to the first light output port pass through different positions of the dispersive element in the second direction and light from the second light input port and light directed to the second light output port pass through different positions of the dispersive element in the second direction.

13. The wavelength selective switch according to claim 12, wherein a light entry angle to the light deflection element in the second direction is set by the light condensing element so that light from the first light input port reaches the first light output port and light from the second light input port reaches the second light output port.

14. The wavelength selective switch according to claim 8, wherein the dispersive element is inclined in the first direction with respect to the predetermined axis.

15. The wavelength selective switch according to claim 1, wherein the light input/output unit further includes an alignment port that alignment light enters and exits by an optical axis along the predetermined axis, separately from the first and second light input/output ports.

16. The wavelength selective switch according to claim 15,
wherein the alignment port includes an optical fiber and a light condensing element optically coupled to an end surface of the optical fiber, and
wherein an optical axis of the optical fiber and an optical axis of the light condensing element coincide with each other.

17. The wavelength selective switch according to claim 15, wherein at least one alignment port is provided in each of the first and second portions.

18. The wavelength selective switch according to claim 15, wherein a common alignment port is provided between the first and second portions.

19. The wavelength selective switch according to claim 1,
wherein the light input/output unit further includes an alignment port that alignment light enters and exits by an optical axis along the predetermined axis, separately from the first and second light input/output port, and
wherein some light input/output ports of the first and second light input/output ports and the remaining light input/output ports are disposed side by side in a second direction intersecting the predetermined axis and the first direction and at least one alignment port is provided for each of some light input/output ports and the remaining light input/output ports.

20. The wavelength selective switch according to claim 1,
wherein the light deflection element is a phase modulation element having a plurality of pixels for performing phase modulation and configured to deflect an optical path of entry light by presenting a diffraction-grating-shaped phase modulation pattern, and
wherein light entry and exit angles of the first and second light input/output ports with respect to the predetermined axis are set so that an optical axis of light arriving from the first and second light input ports is orthogonal to a modulation surface of the phase modulation element within a surface including the predetermined axis and the first direction.

21. The wavelength selective switch according to claim 20, further comprising:
a previous-stage optical system disposed on the predetermined axis between the light input/output unit and the dispersive element; and
a light condensing element disposed on the predetermined axis between the dispersive element and the light deflection element,
wherein the previous-stage optical system and the light condensing element change an optical path of light from the first and second light input ports so that the optical axis of the light arriving from the first and second light input ports is orthogonal to the modulation surface of the phase modulation element within a surface including the predetermined axis and the first direction.

22. The wavelength selective switch according to claim 21, wherein central optical axes of the previous-stage optical system and the light condensing element in the first direction coincide with each other.

23. The wavelength selective switch according to claim 22,
  wherein an optical axis of entry and exit light of the first light input/output port and an optical axis of entry and exit light of the second light input/output port are symmetrical with respect to a predetermined axis, and
  wherein the predetermined axis is an axis for which an optical axis of the light is orthogonal to the modulation surface of the phase modulation element within the surface including the predetermined axis and the first direction, when light exiting along the predetermined axis reaches the modulation surface of the phase modulation element.

* * * * *